US010279829B2

(12) United States Patent
Walkner

(10) Patent No.: US 10,279,829 B2
(45) Date of Patent: May 7, 2019

(54) ERGONOMIC CARTS FOR METAL FORMING OPERATIONS

(71) Applicant: Charles William Walkner, Gladstone, MI (US)

(72) Inventor: Charles William Walkner, Gladstone, MI (US)

( * ) Notice: Subject to any disclaimer, the term of this patent is extended or adjusted under 35 U.S.C. 154(b) by 0 days.

(21) Appl. No.: 15/652,072

(22) Filed: Jul. 17, 2017

(65) Prior Publication Data

US 2018/0015940 A1    Jan. 18, 2018

Related U.S. Application Data

(60) Provisional application No. 62/393,626, filed on Sep. 12, 2016, provisional application No. 62/362,761, filed on Jul. 15, 2016.

(51) Int. Cl.
*B62B 3/06* (2006.01)
*B62B 3/04* (2006.01)
*B62B 3/10* (2006.01)

(52) U.S. Cl.
CPC .............. *B62B 3/0631* (2013.01); *B62B 3/04* (2013.01); *B62B 3/10* (2013.01); *B62B 3/0643* (2013.01); *B62B 2203/10* (2013.01); *B62B 2203/74* (2013.01); *B62B 2205/06* (2013.01); *B62B 2205/32* (2013.01); *B62B 2206/06* (2013.01); *B62B 2301/04* (2013.01)

(58) Field of Classification Search
CPC . B62B 3/0631; B62B 3/0643; B62B 2203/10; B62B 2301/04; B66F 9/12; B66F 9/06; B66F 9/125; B66F 9/195; B66F 7/0625; B66F 7/065; B66F 7/08
See application file for complete search history.

(56) References Cited

U.S. PATENT DOCUMENTS

| | | | | |
|---|---|---|---|---|
| 6,090,031 | A * | 7/2000 | Golicz | B65G 57/28 414/790.1 |
| 7,188,843 | B2 * | 3/2007 | Magness | B25H 5/00 280/30 |
| 7,789,611 | B2 * | 9/2010 | Wilson | B62B 3/04 280/47.15 |
| 7,972,252 | B1 * | 7/2011 | McDermitt, Jr. | B23Q 3/101 414/226.02 |
| 8,057,374 | B2 * | 11/2011 | McDermitt, Jr. | B23Q 3/101 438/38 |

(Continued)

*Primary Examiner* — Kaitlin S Joerger
(74) *Attorney, Agent, or Firm* — Device Patent LLC

(57) ABSTRACT

Embodiments of various ergonomic carts for metal forming operations and methods of use are enclosed. Each ergonomic cart eases transport of a machine tool between a machine tool storage rack and a manufacturing machine. Some forms of the ergonomic carts comprise an elevator portion to adjust to various machine and storage rack heights. Some cart embodiments include a tumbler mounted to a superior portion of a cart for rotating a machine tool in space for movement between a storage configuration and a load configuration. Various forms of tumblers are described and illustrated. Each tumbler comprises a punch channel which is rotatable within said tumbler portion between a superior facing position and an inferior facing position. In other embodiments, a clamp rack system offers a convenient method to store press clamps.

19 Claims, 30 Drawing Sheets

(56) References Cited

U.S. PATENT DOCUMENTS

| | | | | |
|---|---|---|---|---|
| 8,087,133 B2* | 1/2012 | Jerger | ............ | B66F 9/183 |
| | | | | 28/107 |
| 9,309,008 B2* | 4/2016 | Boulanger | ............ | B64F 5/0036 |
| 9,388,029 B2* | 7/2016 | Ziaylek | ............ | B65G 7/00 |
| 9,771,990 B2* | 9/2017 | Slee | ............ | B66F 9/06 |
| 9,815,672 B2* | 11/2017 | Baudermann | ......... | B66F 7/0625 |
| 2008/0014072 A1* | 1/2008 | Seggern | ............ | B62B 3/0643 |
| | | | | 414/787 |
| 2014/0264207 A1* | 9/2014 | Sekine | ............ | B60L 11/1803 |
| | | | | 254/2 C |
| 2015/0028787 A1* | 1/2015 | Sekine | ............ | B66F 9/24 |
| | | | | 318/494 |
| 2017/0331414 A1* | 11/2017 | Bailey | ............ | H02S 20/10 |
| 2017/0360173 A1* | 12/2017 | Berger | ............ | B62B 3/022 |

* cited by examiner

ERGONOMIC CARTS FOR METAL FORMING OPERATIONS

This application claims priority to Provisional Patent Application No. 62/362,761 filed Jul. 15, 2016, the entire disclosure of which is hereby incorporated by reference and relied upon. This application also claims priority to Provisional Patent Application No. 62/393,626 filed Sep. 12, 2016, the entire disclosure of which is hereby incorporated by reference and relied upon.

BACKGROUND OF THE INVENTION

Field of the Invention

The invention relates generally to carts, and more particularly to carts and accessories for the ergonomic transport of press brake dies and clamps used in metal forming operations.

Sheet metal fabricators use press brakes to create bends in sheet metal. The bends vary in radius and other parameters therefore requiring the rapid change of various press dies and clamps during forming operations. This creates a tooling management issue where clamps that have been removed from the press are often in the way of staged bending, box bends, or odd shaped parts. The prior art includes tool storage systems however these systems have several deficiencies and do little to relieve the physical burden and time required to move this tooling.

What is needed are storage systems that are configured for quick storage, retrieval, and organization of tooling in the order that the dies are removed from the machine. Also needed are storage systems configured to relieve users from physical demands required to move tooling.

SUMMARY OF THE INVENTION

The instant invention discloses various mobile ergonomic cart systems for the rapid storage, retrieval, and organization of sheet metal brake dies and clamps.

Sheet metal press dies are generally rectangular in shape and very heavy. In some shops the machine operators are responsible for manually lifting and loading the press dies from a storage rack and loading it into a press. Due to the weight and size of these dies, it is not uncommon for press operators to accidently drop the dies to the floor consequently damaging the expensive dies. More importantly, operators often sustain injuries due to the bending, twisting, and lifting of the dies during the process of moving the dies from a storage rack to the press and back. A novel rolling cart is disclosed comprising a variety of features that removes the effort and safety hazards associated with moving the dies.

In a preferred form a die cart includes a cart handle for grasping by the user and casters whereby the user may move the cart under their own power to various locations in a shop and particularly between a press and a die storage rack.

In one form a die cart comprises an elevator feature for elevating and lowering a carrier frame on which a die is supported and transported. This feature provides the capability to match the height of a carrier frame to an external surface on which the die will be unloaded to or loaded from thereby eliminating the need for the user to lift the die at any point in the die transfer.

In some forms the carrier frame comprises a low resistance surface such as a plurality of rollers generally aligned in a horizontal plane. The rollers provide low resistance for easily sliding a die between the supporting roller surface and a support on a storage rack or to a press.

In some forms the elevator feature is in the form of a jack of various types such as a scissors jack. The jack may be powered or manually driven by the force of the user. When powered, the power may come from an external power source such as an electrical outlet or an on-board power source such as a battery. Powered units for example, may be in the form of a motorized linear actuator, or hydraulic or pneumatic pump driving a complementary lift cylinder. A lift control, generally in the form of a switch, is included for the user to control the elevation motion.

Manually driven jacks may use a removable or stationary crank or elongate handle to drive energy into the jacking system. In a preferred form, the jack is of a scissors type comprising an upper and a lower scissors assembly causing a change in height between a lower frame assembly and a carrier frame. A manual pump handle operatively connected to a hydraulic pump is pumped by the user thereby causing an increase in hydraulic pressure in a hydraulic cylinder and activating the scissors jack to elevate. A relief valve operatively connected to the hydraulic pump relieves the pressure in the hydraulic cylinder causing a lowering the scissors jack.

In a preferred form, one or more gates serve as a barrier to prevent a die from unintentionally moving off a carrier frame and falling towards the floor potentially causing damage to the die and the nearby user. The gate may assume a variety of forms all capable to block movement of die off a carrier. For example, the gate may be in the form of a pivoting U-shaped member that can be pivoted up and out of the way by the user, a removable post, an adjustable roller, a swinging door, or other functionally equivalent system. Gates may be placed at both ends of the carrier whereby the die can be loaded from one side of the carrier and unloaded from the other side of the carrier without the need to pivot the die cart 180 degrees.

In one form a die cart includes a bellows extending between a carrier frame and lower frame assembly. The bellows is fully capable of compressing and extending as the distance between the carrier frame and lower frame assembly changes. The bellows serves to eliminate accidental injury by blocking the user or other materials from the internal jacking mechanisms.

In some forms, the die cart may comprise lockable casters or other activated braking mechanism to prevent unintentional rolling of the cart when parked at a predetermined location.

In some forms, casters on carts are free-wheeling and in other forms casters may be power-driven. In some forms, casters on carts are steerable, fixed direction, or a combination of each type.

In an alternative form, a die cart is configured with a tumbler for eased loading and unloading of machine tooling such as punches between a storage cart and manufacturing machine.

In one form, a rotatable tumbler provides a generally horizontally oriented restraining channel into which a tool is received from a storage cart.

In one form, the generally horizontally oriented restraining channel is in the form of a first punch channel which may include a retainer recess to hold tooling from falling from the first punch channel.

In one form, the rotatable tumbler with tool is rotated 180 degrees to an inverted position so as to position the tool to move into the upper tool holder of a press brake.

In one form, a carrier frame comprises a load carrier and a plurality of rollers.

In one form, a load carrier is in the form of a U-shaped channel with rollers mounted horizontally along the length of the U-shaped channel.

In one form, a tumbler is mounted to a superior end of an adjustable height cart.

In one form, a mount surface is located at a superior end of an adjustable height cart.

In one form, a tumbler is mounted to a carrier frame portion of an adjustable height cart.

In one form, a tumbler is mounted to a upper main frame portion of a carrier frame portion of an adjustable height cart.

In one form, a tumbler is mounted to an upper main frame of a rolling cart.

In one form, a tumbler is configured to secure a machine tool within a first punch channel of a first punch rail.

In one form, a tumbler is configured to secure a punch tongue of a punch tool within a first punch channel of a first punch rail.

In one form, a tumbler is configured to secure a punch foot within a second punch channel of a second punch rail.

In one form, a first punch rail or a second punch rail or both first and second punch rails are configured to secure a punch tongue of a specific style of punch/die.

In one form, one or more of a first punch rail and a second punch rail may be configured to secure a variety of punch/die styles.

In one form, a first punch channel is rotatable between a superior facing position and an inferior facing position.

In a storage configuration, said first punch channel is configured to generally align with a rack channel on a storage rack for sliding movement transition of machine tooling such as a punch therebetween.

In a load configuration, said first punch channel is configured to align with a tool channel on a manufacturing machine such as a sheet metal press for sliding movement transition of machine tooling such as a punch therebetween.

In one form, a tumbler rotates during movement between a storage configuration and a load configuration wherein in a storage configuration a first punch channel is generally aligned with a rack channel of a punch storage rack and wherein in a load configuration a first punch channel is generally aligned with a tool channel of a sheet metal press brake.

In one form, a tumbler rotates generally 180 degrees during movement between a storage configuration and a load configuration.

In one form, a tumbler rotates a tool loaded therein between a storage configuration and a load configuration for eased movement of the tool between a storage rack and an inverted upper tool channel on a press.

In one form, tumbler rotation provides for the mechanical rotation in space of tooling loaded in a tumbler between a storage configuration and a load configuration with minimal effort from a user.

In one form, a tumbler comprises a pair of opposed rotary rings.

In one form, a rotary ring is fully enclosed wherein in other forms a rotary ring is partially open such as in a C-shape.

In one form, a first punch rail extends between two spaced rotary rings.

In one form, a second punch rail extends between two spaced rotary rings.

In one form, a first punch rail and a second punch rail are fixed to a rotary ring.

In one form, a first punch rail and a second punch rail are removable such that they may be interchanged with punch rails configured for use with a particular style of punch.

In one form, a first rotary ring is generally situated over one end of a superior surface of an adjustable height cart and a second rotary ring is generally situated over an opposed end of a superior surface of an adjustable height cart.

In one form, a ring brake is situated above a superior surface of an adjustable height cart.

In one form, an elongate axis of a first punch channel and an elongate axis of a second punch channel are generally orientated horizontal.

In one form, a first rotary ring and a second ring stand generally vertical.

In one form, a rotary ring comprises a plate portion and a groove portion.

In one form, a plate portion of a rotary ring comprises an outer radial surface.

In one form, a groove portion of a rotary ring comprises an enclosed curvilinear groove inset the groove portion.

In one form, a plate portion and a groove portion of a rotary ring are secured together by welds or fasteners.

In one form, a plate portion and a groove portion of a rotary ring are unitary.

In one form, a first rotary ring and a second ring stand on a pair of spaced rotary glides.

In one form, a tumbler rotates about an elongate axis extending through a center of a first and a second rotary ring.

In one form, tumbler rotation is driven by forces imparted by a user's hand.

In one form, tumbler rotation is driven by one or more of; a powered drive system, and a crank mechanism using gears, and a chain, and a belt.

In one form, a pair of spaced rotary glides are disposed on a lower tumbler bracket.

In one form, a rotary glide is in the form of two or more rollers.

In one form, a rotary glide is in the form of a low friction surface.

In one form, a tumbler includes a brake system to control rotary ring rotation.

In one form, a tumbler brake system is in the form of a movable pin preventing rotation of a rotary ring when engaged with a rotary ring.

In one form, a powered drive system or crank mechanism is utilized to control rotation of a rotary ring by use of gears, chain, or belt.

In one form, a brake caliper is disposed on a lower tumbler bracket.

In a stopped configuration, a brake ring is squeezed between a pair of brake pads disposed within a brake caliper to prevent movement thereof.

In a free configuration, a brake ring glides with low frictional resistance between a pair of brake pads disposed within a brake caliper.

In a control configuration, a brake ring is squeezed sufficiently between a pair of brake pads disposed with in a brake caliper to provide a controlled rotation of a tumbler.

In one form, a brake handle is configured for activation of a brake caliper to change tumbler between a stopped, controlled, and free configurations.

In one form, one or more stabilizers extend between one or more of the following; a first rotary ring, a second rotary ring, and a brake ring.

In one form, a tumbler comprises a stop.

In one form, a tumbler comprises a stop in the form of a pin extending from a lower tumbler bracket.

In one form, a tumbler comprises a stop in the form of a pin extending into an enclosed curvilinear groove inset the groove portion of a rotary ring.

In one form, a tumbler comprises a stop to keep a rotary ring fixed to a rotary glide.

In one form, a tumbler comprises a stop to limit rotation of a rotary ring.

In one form, a mobile adjustable height cart comprises a jack for adjusting the height of a tumbler for aligning a punch channel with complementary channels on a machine or storage cart.

In one form, an ergonomic cart has a linkage tumbler portion comprising a first linkage support arm extending from a carrier frame.

In one form, an ergonomic cart has a tumbler portion comprising a second linkage support arm extending from a carrier frame.

In one form, a tumbler portion comprises a first driven arm pivotably attached at a first pivot to said first linkage support arm.

In one form, a tumbler portion comprises a second driven arm pivotably attached at a second pivot to said second linkage support arm;

In one form, a tumbler portion comprises a first driven link pivotably attached at a third pivot to an end of a first driven arm.

In one form, a tumbler portion comprises a second driven link pivotably attached at a fourth pivot to an end of said second driven arm.

In one form, a tumbler portion comprises at least one horizontal punch rail extending between a first driven link and a second driven link.

In one form, a tumbler portion comprises a first sprocket aligned with said first pivot.

In one form, a tumbler portion comprises a second sprocket aligned with said third pivot.

In one form, a tumbler portion comprises a first sprocket and a second sprocket coupled by a chain.

In one form, rotational movement of a first sprocket causes consequent movement of a punch channel of a punch rail between a position wherein the punch channel faces superiorly and a position wherein the punch channel faces inferiorly.

In one form, a method of using an ergonomic cart for eased transport of a machine tool between a machine tool storage rack and a manufacturing machine comprises the following steps. Obtaining a movable cart having an elevator portion for adjusting the height of a tumbler portion and wherein said tumbler portion comprises a punch rail having a generally horizontal punch channel extending along the length of the punch rail. Adjusting the height of said elevator portion. Setting the tumbler to a storage configuration wherein a first punch channel is configured to generally align with a rack channel on a storage rack. Sliding a machine tool from said rack channel on the storage rack into the first punch channel on said tumbler. Moving the ergonomic cart from the machine tool storage rack to a manufacturing machine. Setting said tumbler to a load configuration wherein said first punch channel is rotated generally 180 degrees. Adjusting the height of said elevator portion. Aligning said first punch channel with a tool channel on a manufacturing machine. Sliding the machine tool from said first punch channel into said tool channel. Moving the ergonomic cart away from the manufacturing machine. The step of transitioning the tumbler between storage configuration and a load configuration may include the step of rotating one or more rotary rings. Reversal of these steps may be used to transport a machine tool such as a punch from a manufacturing machine to a storage rack.

Press clamps are also very heavy. Embodiments of a clamp rack system is disclosed offering a mobile and convenient cart for storing, retrieving, and organizing press clamps while minimizing the ergonomic challenges when using the press clamps in a manufacturing environment.

Press clamps typically weigh about 20 lbs. and are often very slippery. The clamps are precision ground to tight tolerances and can be severely damaged if they are roughly handled or dropped on the floor which may lead to imperfections in the press operations and further to parts formed with unacceptable geometric tolerances. Dropping a clamp can also cause severe injury to the user. Damaged clamps typically cost more than $700 each to replace. This represents a large investment as a 10 foot press can hold 16 clamps but with proper care clamps can last the life of the press.

The disclosed mobile clamp rack system also provides organization to the clamps to insure a press clamp can be replaced in the same place in the press it was removed from as often the clamps are adjusted individually to compensate for errors in the machine. For example, clamps may be stored on a rack from the left most clamp on the press at the top of a rack system progressing to the right most clamp on the press at the bottom of a rack system.

In preferred forms, a mobile clamp rack system arranges the press clamps to be accessible from an outside generally vertical plane aligned adjacent one or more sides of a clamp cart. This clamp arrangement provides the user instant and ergonomic clamp access. All obstructions to accessing the press clamps are eliminated therein minimizing the need for the user to bend or twist to retrieve them. In a preferred embodiment, the system comprises opposing columns formed of a paired outer slotted strut and inner slotted strut. Aligned slots of an outer slotted strut and an inner slotted strut form a plurality of slot corridors in which the holder portion of clamps may be inserted. This provides for easy insertion or removal of a clamp by tilting or sliding the clamp in or out of a slot. When residing in a slot corridor, a clamp body extends from a first outer clamp slot such that they can be firmly gripped at both ends by the operator for easy clamp removal. In preferred forms, a rack system comprises an opposed slot corridor on an opposing side of a cart. In alternative forms a slotted strut may also be provided on a back or front side of the cart.

In some forms, a mobile clamp rack system comprises a positioner activator operationally connected to a mid strut comprising a plurality of middle clamp slots. The positioner activator causes a mid strut to slide in at least two directions. In some forms the middle clamp slots replicate the profile of outer and inner clamp slots which are generally rectangular and form an opening sufficient for insertion of a holder portion of a press clamp.

In a locked configuration the positioner activator causes middle clamp slots by movement of a mid strut to be misaligned with the rest of the slot corridor and interfere with clamp holder portions of a press clamp. In an unlocked configuration the positioner activator causes middle clamp slots by movement of a mid strut to be aligned with the rest of the slot corridor thereby providing easy removal and insertion of a clamp.

In some forms, opposing columns are secured between a superior frame and an inferior frame.

In some forms an inferior frame comprises one or more base legs to support the rack. The base legs may include a caster plate on which casters are mounted to provide rolling mobility of the rack system by push of the user on one of the struts. The casters may be lockable or a braking mechanism may be included in the rack to limit unintentional moment of the rack system.

In some forms a tray assembly is secured between opposed columns and operable as a work surface for paper work, a lap top computer, tablet or other device placement. In preferred embodiments, the tray assembly is angled towards the user with respect to the ground to provide the user improved ergonomic access. A tray blocker prevents items placed on a tray from sliding off. In some forms one or more tray supports are provided to mount a tray to an opposed set of struts. Strut restraints may be provided at various vertical heights on the struts to adjust tray height. In some forms the tray assembly is secured to a pair of opposing struts to increase stability of the strut members.

In some forms components of the ergonomic cart are restrained together by fasteners such as screws, bolts, nuts, and washers. In other forms the components are welded, or otherwise bonded together. In yet other forms, a combination of fasteners, welds, or bonds may be used.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF SELECTED EMBODIMENTS OF THE INVENTION

Detailed views and descriptions of various embodiments of mobile ergonomic cart systems for the rapid storage, retrieval, and arrangement of sheet metal brake dies and clamps are disclosed herein. Various embodiments of die carts are illustrated at the 000 level. Ergonomic carts in the form of a clamp rack system are illustrated at the 100 and 200 level. Various embodiments of tumbler systems are identified at the 300, 400, and 500 levels. Tumblers may be mounted to embodiments of die carts disclosed herein.

A preferred embodiment of a die cart is illustrated in FIGS. 1-11. A die cart 10 comprises a cart handle 78 for grasping by the user to move and control the die cart. In this embodiment the cart handle 78 is in the form of an inverted U shaped tube member secured to a lower frame assembly 80. The ends of the U may be secured by welds, fasters, or the like to the top surface of opposing first and second base leg 32, 33 portions of the lower frame assembly 80. The top portion of cart handle 78 is offset away from the cart extending toward the user for better ergonomic control.

Figure 1:
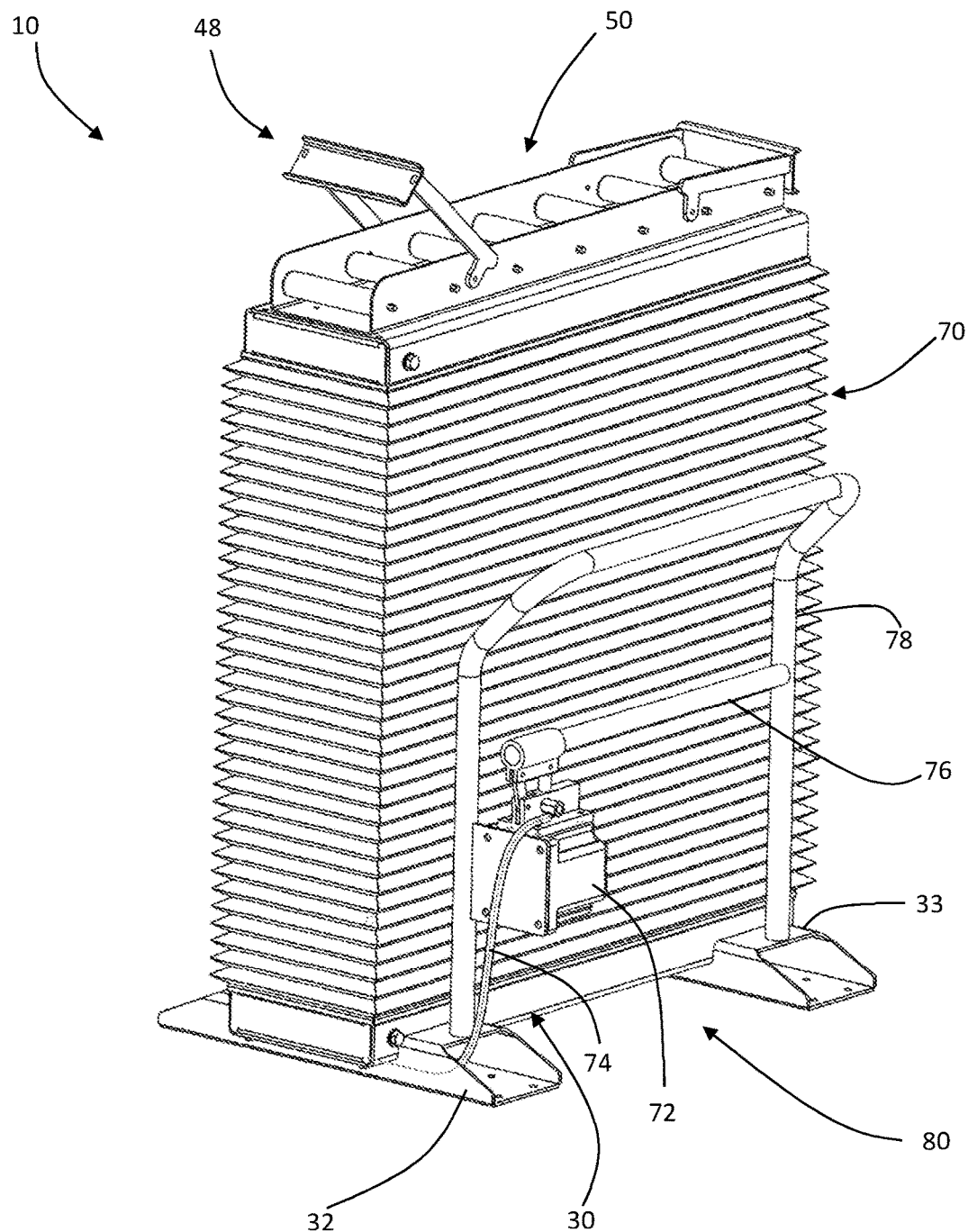
FIG. 1 depicts a perspective view of an ergonomic die cart with casters removed according to one or more embodiments shown and described herein.
Figure 2:
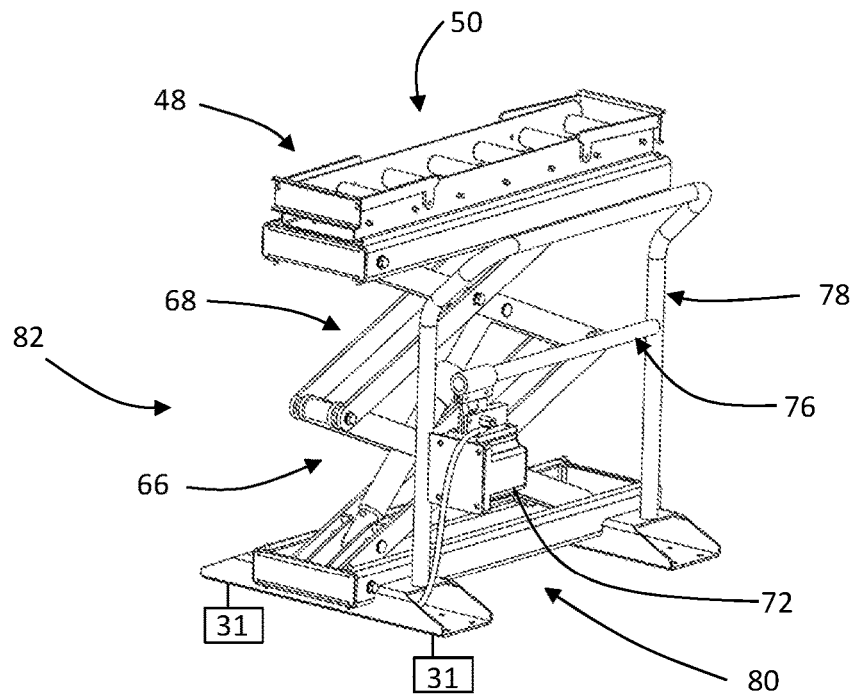
FIG. 2 depicts a perspective view of an ergonomic die cart with casters and bellows removed according to one or more embodiments shown and described herein.

As illustrated in FIG. 2, a die cart 10 comprises an elevator feature in the form of a scissors jack 82 for elevating and lowering a carrier frame 50 on which a die (not shown) is supported on rollers. This feature provides the capability to match the height of the carrier frame 50 to an external surface on which a die will be unloaded to or loaded from thereby eliminating the need for the user to lift the die at any point in the die transfer.

Figure 3:
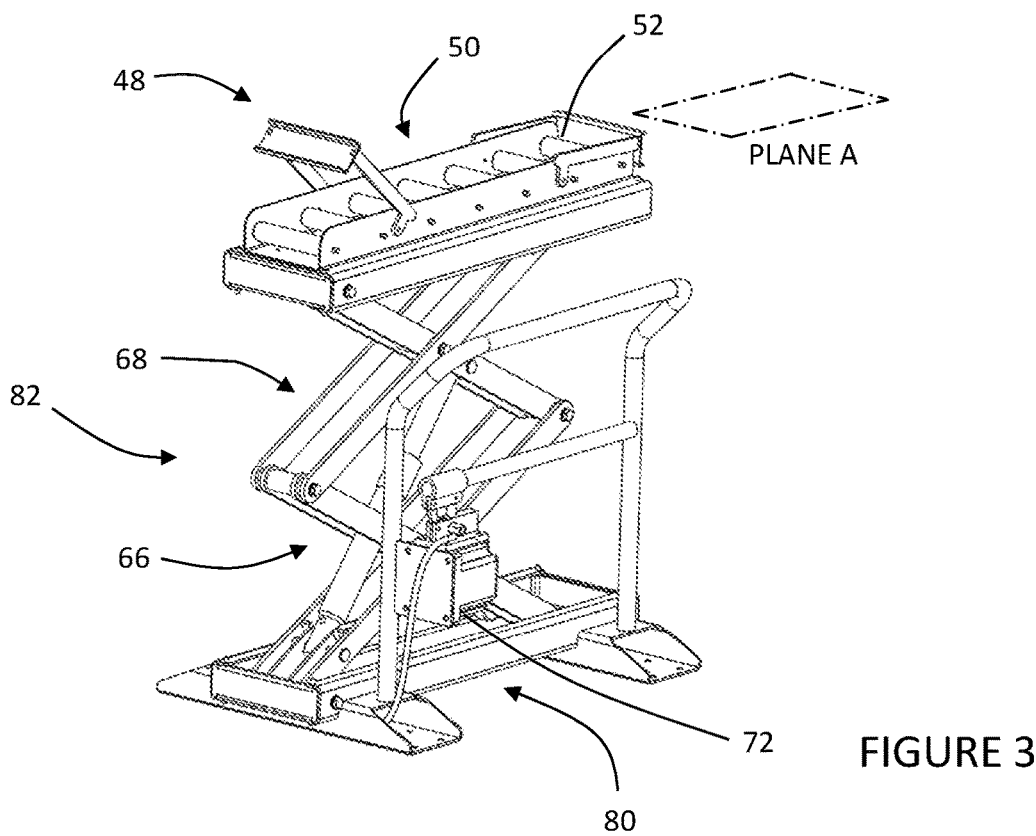
FIG. 3 depicts a perspective view of an ergonomic die cart with casters and bellows removed according to one or more embodiments shown and described herein.

In the FIGS. 2 and 3 embodiment, a carrier frame 50 comprises a plurality of rollers 52 generally aligned in a horizontal Plane A. Rollers 52 provide a low resistance surface for easily sliding a die between the supporting roller surface aligned with Plane A and a support surface on an external storage rack or on to a press. A first side guide 39 and a second side guide 41 prevent the tool from sliding laterally off the rollers.

In some forms an elevator feature is in the form of a jack of various types such as a scissors jack. The jack may be powered or manually driven by the force of the user. When powered, the power may come from an external power source such as an electrical outlet or an on-board power source such as a battery. Powered units for example, may be in the form of one or more of; a motorized linear actuator, and a hydraulic or pneumatic pump driving a complementary lift cylinder. Manually driven jack systems may use a crank or elongate handle to drive energy into a jacking system. In a preferred form as illustrated in FIGS. 2-5, an elevator is of a scissors type jack 82 comprising an upper 68 and a lower 66 scissors assembly causing a change in height between a lower frame 80 assembly and a carrier frame 50. A manual pump handle 76 operatively connected to a hydraulic pump 72 is pumped by the user thereby causing an increase in hydraulic pressure in pressure cylinder 60 through pressure tube 74 thereby activating the scissors jack 82 to elevate. A relief valve 24 (FIG. 12-13) on hydraulic pump 72 relieves the pressure in the hydraulic cylinder causing a consequent lowering of scissors jack 82.

Figure 5:
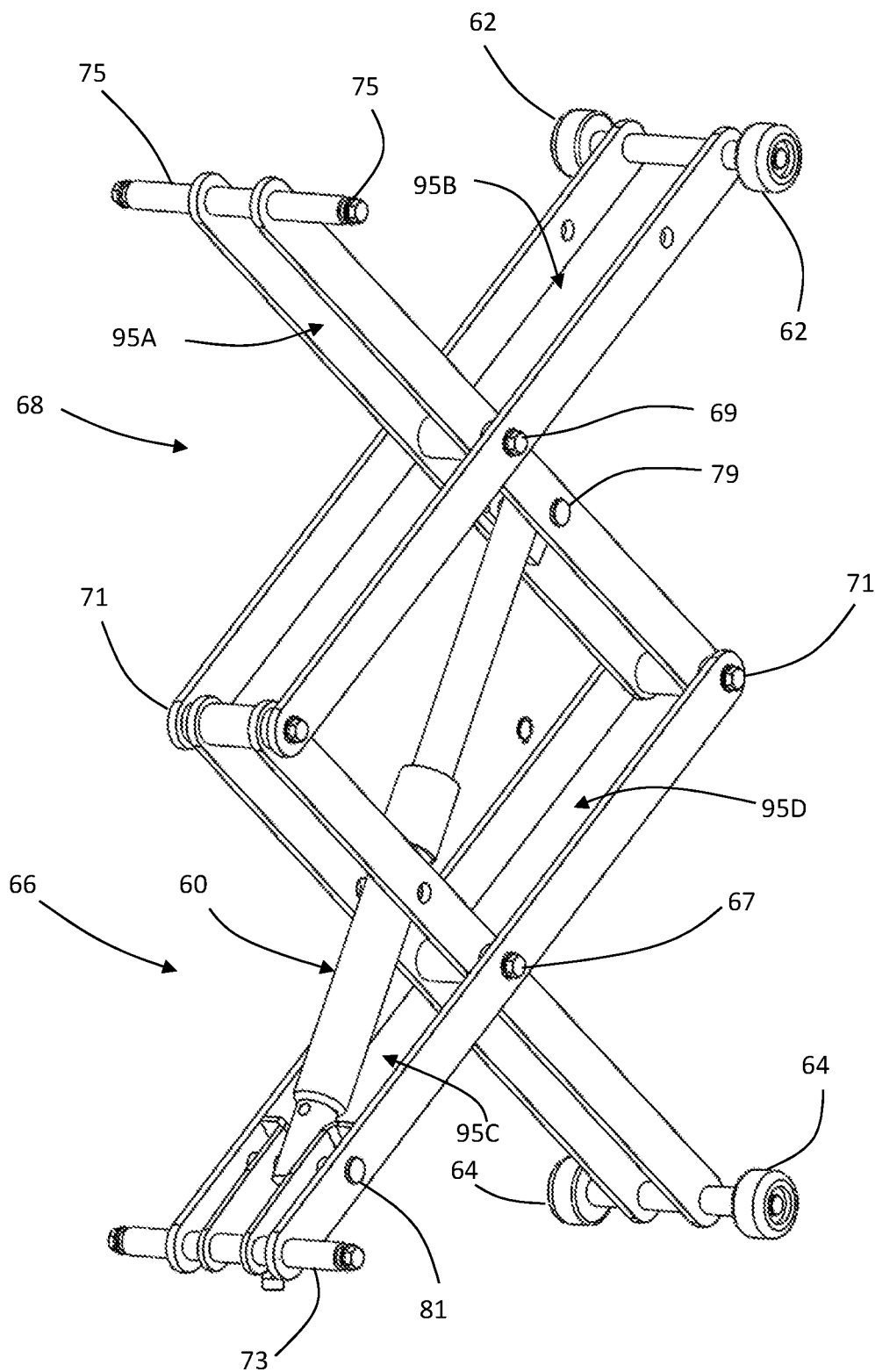
FIG. 5 depicts a perspective view of a scissors jack portion of an ergonomic die cart according to one or more embodiments shown and described herein.
Figure 6:
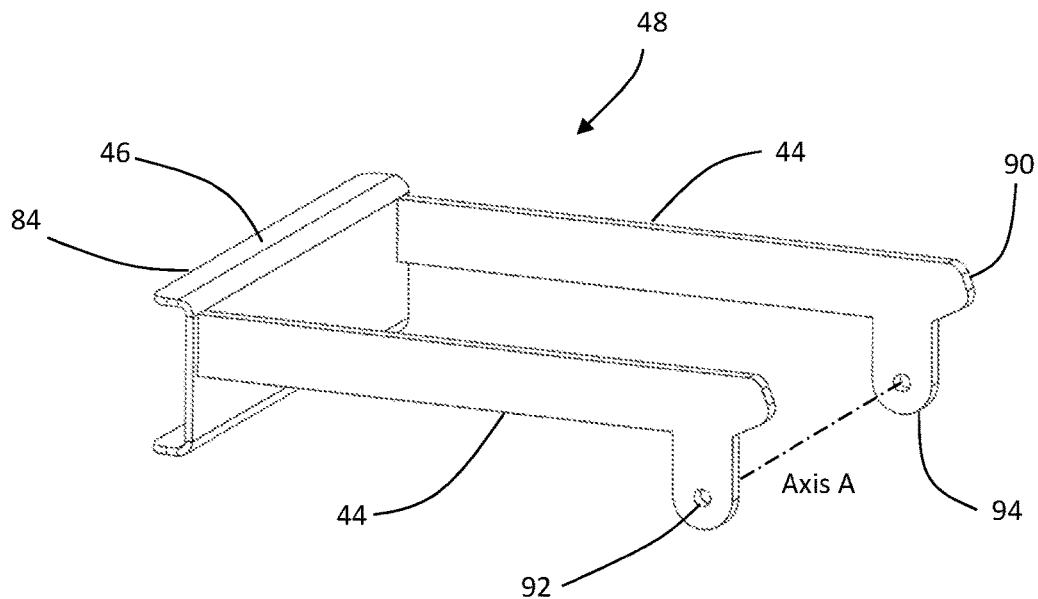
FIG. 6 depicts a perspective view of a gate of a carrier frame according to one or more embodiments shown and described herein.
Figure 7:
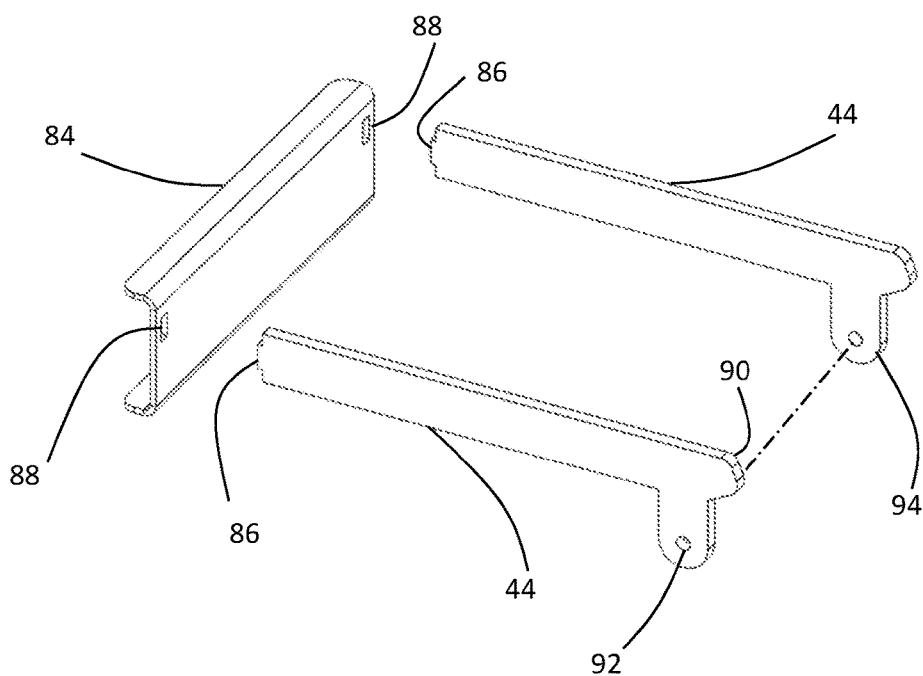
FIG. 7 depicts an exploded perspective view of a gate of a carrier frame according to one or more embodiments shown and described herein.
Figure 8:
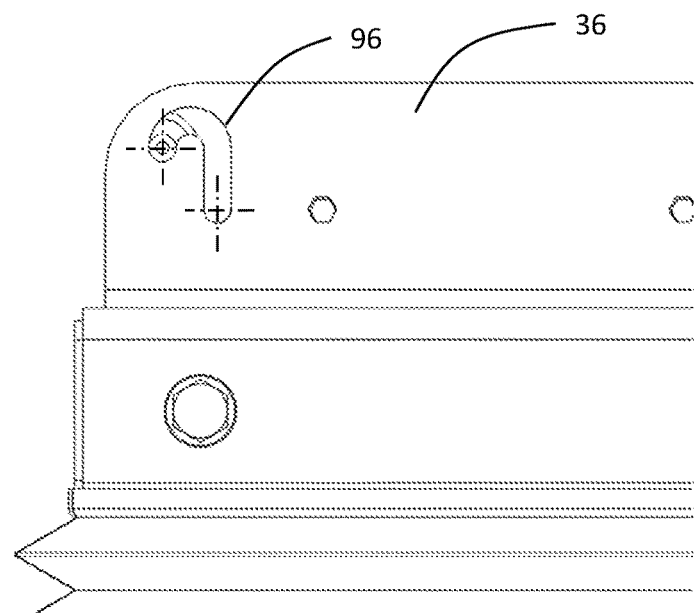
FIG. 8 depicts a side view of a gate guide of a carrier frame according to one or more embodiments shown and described herein.
Figure 9:
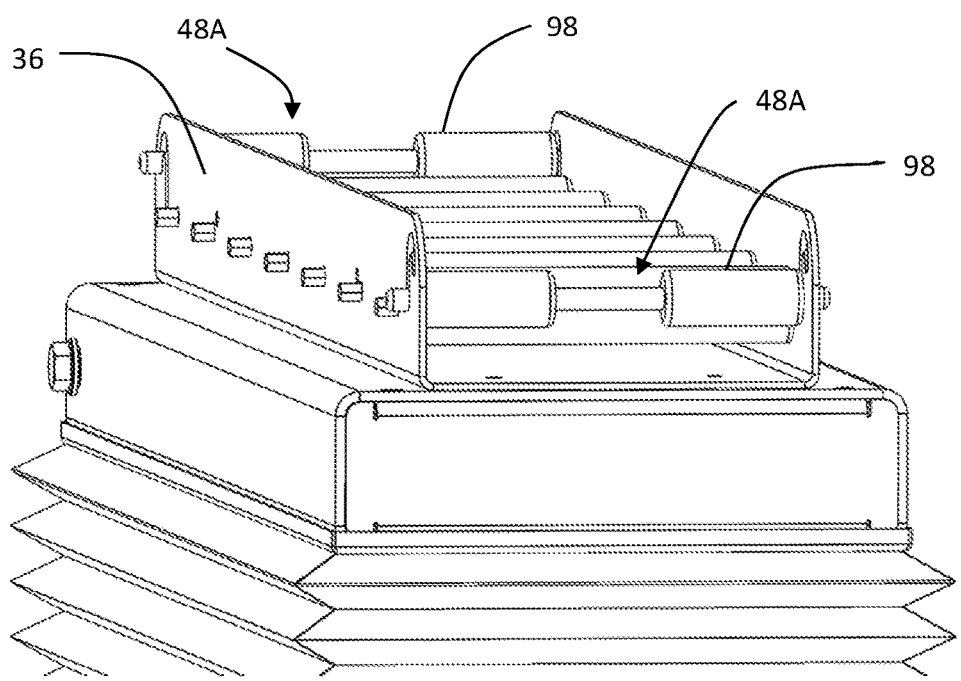
FIG. 9 depicts a perspective view of a roller gate spindle of a carrier frame according to one or more embodiments shown and described herein.
Figure 10:
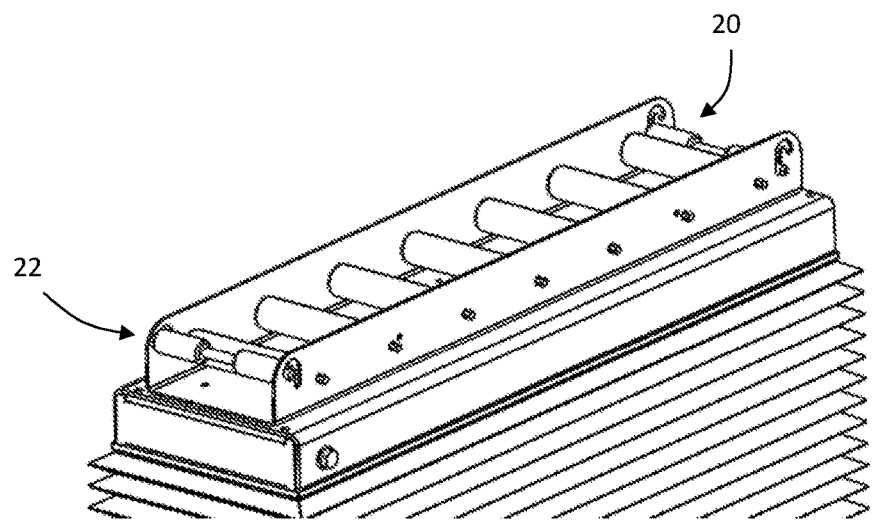
FIG. 10 depicts a perspective view of a carrier frame illustrating one raised and one lowered gate spindle according to one or more embodiments shown and described herein.
Figure 11:
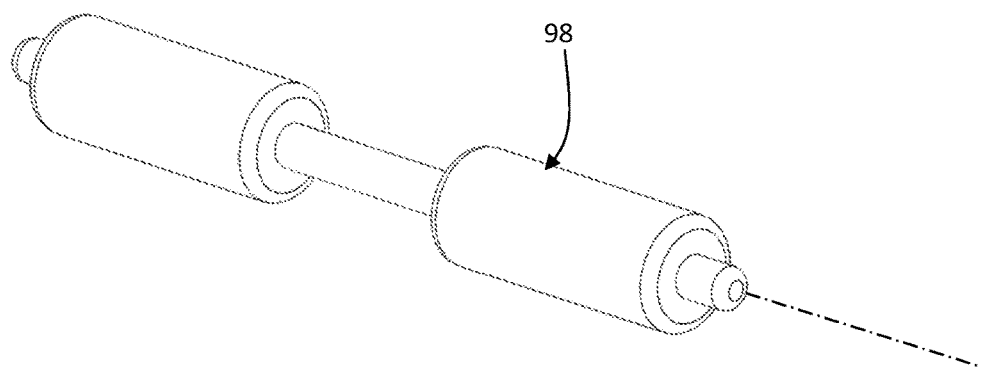
FIG. 11 depicts a perspective view of a gate spindle according to one or more embodiments shown and described herein.

Primary components of the scissors jack 82 used in this embodiment are illustrated in FIG. 5. The scissors jack comprises an upper 68 and lower 66 scissors assembly comprising opposed pairs of lift rails 95A-95D. Upper lift rails 95A and 95B pivot about an upper central pivot 69 and lower lift rails 95C and 95D pivot about lower central pivot 67. Joining the upper lift rails to the lower lift rails are lateral pivots 71. Lower main frame pivot 73 is secured within an aperture of lower main frame 30. Upper main frame pivot 75 is secured within an aperture of upper main frame 38. Both frame pivots 73, 75 are free to pivot but limited from translation. During raising and lowering of scissors jack 82, upper wheels and axle 62 is configured to translate within wheel tunnel of upper main frame wheel tunnel 77A. Simultaneously, lower wheels and axle 64 is configured to translate within wheel tunnel of lower main frame wheel tunnel 77B. Pressure cylinder 60 is pivotably connected at upper cylinder pivot 79 of the upper scissor assembly 68 and at lower cylinder pivot 81 of lower scissor assembly 66. Extension of pressure cylinder 60 imparts forces on the upper and lower scissors assembly resulting in a consequential elevation of carrier frame 50.

Further to this embodiment, a U shaped load carrier 36 is secured to a superior surface of upper main frame 38 by upper fasteners 54. Load carrier 36 comprises a series of axle holes 37 extending through U-shaped load carrier 36 sides. Rollers 52 are mounted within these axle holes 37 to create a rolling top surface generally aligned with plane A. Upper end cap 40 encloses each end of upper main frame 38 to prevent exposure to potential pinch points therein. Lower end cap 58 does the same for lower main frame 30.

In preferred forms, one or more gates 48 serve as a barrier to prevent a die from unintentionally moving off a cart system and falling towards the floor potentially causing damage to the die and the nearby user. A gate 48 may assume a variety of forms all capable to block movement of die off a carrier. For example, the gate may be in the form of a pivoting U-shaped member (FIG. 6, 7) that can be pivoted up and out of the way or rest down to block movement of the die. In this embodiment, the gate 48 comprises opposed gate arms 44 extending from gate joiner 46. Gate joiner 46 comprises a gate handle 84 for eased lifting of the gate illustrated here in the form of an extended flange. Each gate arm may comprise a gate foot 90 on which the gate 48 is rested when lifted to an upright position. A pivot leg 94 extends from each gate arm 44 with gate pivot 92 extending therethrough. A pivot pin or bolt (not shown) extends through the gate pivot 92 along axis A and within a complementary hole in load carrier 36 to provide a pivot axis on which gate 48 can move about. Arm boss 86 is secured in arm receiver 88 by weld.

The gate may assume many other forms such as a removable post, an adjustable roller, or other functionally equivalent systems. For example, FIG. 8-11 illustrates an adjustable roller style gate 48A. Roller gate spindle 98 pivots within opposed inverted 'J' shaped gate guides 96 formed within load carrier 36. When the gate spindle 98 rests in the lower portion of 'J' shaped gate guide 96, the gate spindle 98 functions as another die supporting roller along Plane A. When gate spindle 98 rests in the upper portion of 'J' shaped gate guide 96, gate spindle 98 acts to block movement of a die from moving off the supporting roller surface. This is more clearly apparent in FIG. 10 whereby a gate spindle 98 on the left in the illustration rests in the upper 'J' portion resulting in a closed gate 22 and whereby gate spindle 98 on the right in the illustration rests in the lower 'J' portion resulting in an open gate 20. Gates may be placed at both ends of a load carrier 36 whereby a die can be loaded from one side of load carrier 36 and unloaded from the other side of the carrier without the need to pivot the die cart 180 degrees.

Figure 12:
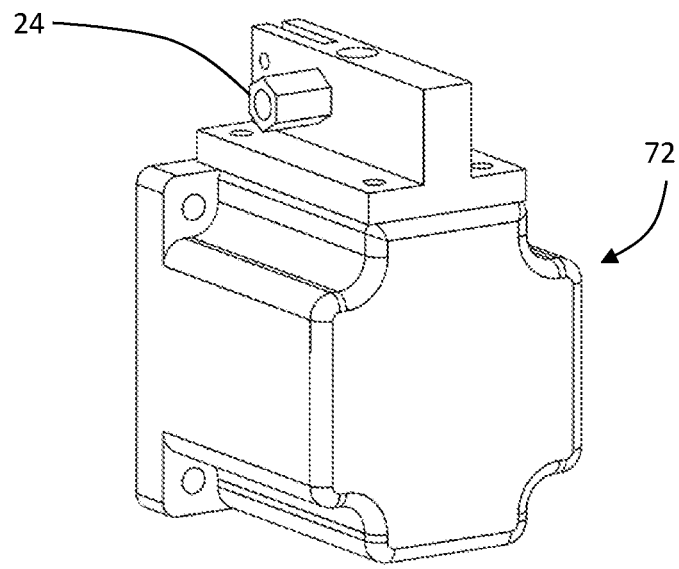
FIG. 12 depicts a front perspective view of a pump according to one or more embodiments shown and described herein.
Figure 13:
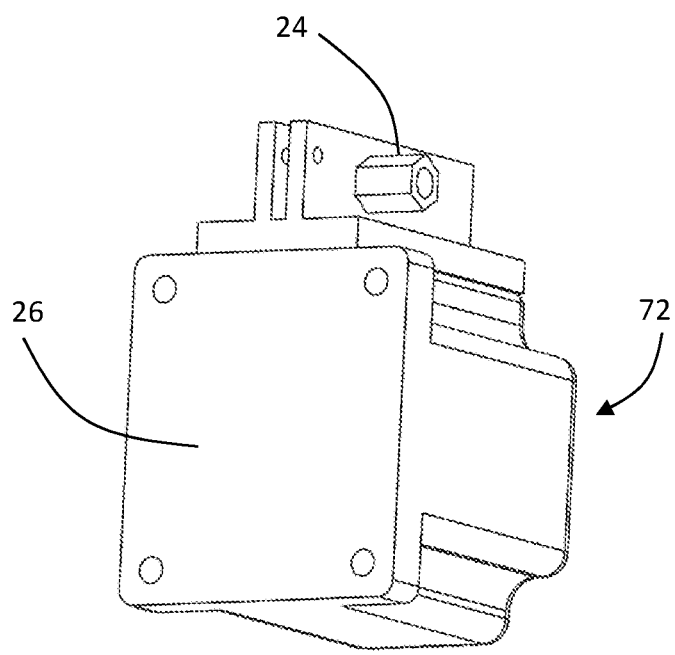
FIG. 13 depicts a rear perspective view of a pump according to one or more embodiments shown and described herein.

FIGS. 12 and 13 illustrate front and rear views of one style of manual hydraulic pump 72 suited to drive pressure cylinder 60. In the embodiment illustrated in FIG. 3 and the exploded view of FIG. 4, the pump is fastened to pump plate 42 by the use of fasteners (not shown) extending through aligned holes on the pump plate 42 and pump 72. Extending from pump 72 and pressure cylinder 60 is pressure tube 74 for transmission of fluid forces required to extend pressure cylinder 60. Pump plate 42 is secured to handle 78. A weld may be used for this purpose.

Figure 4:
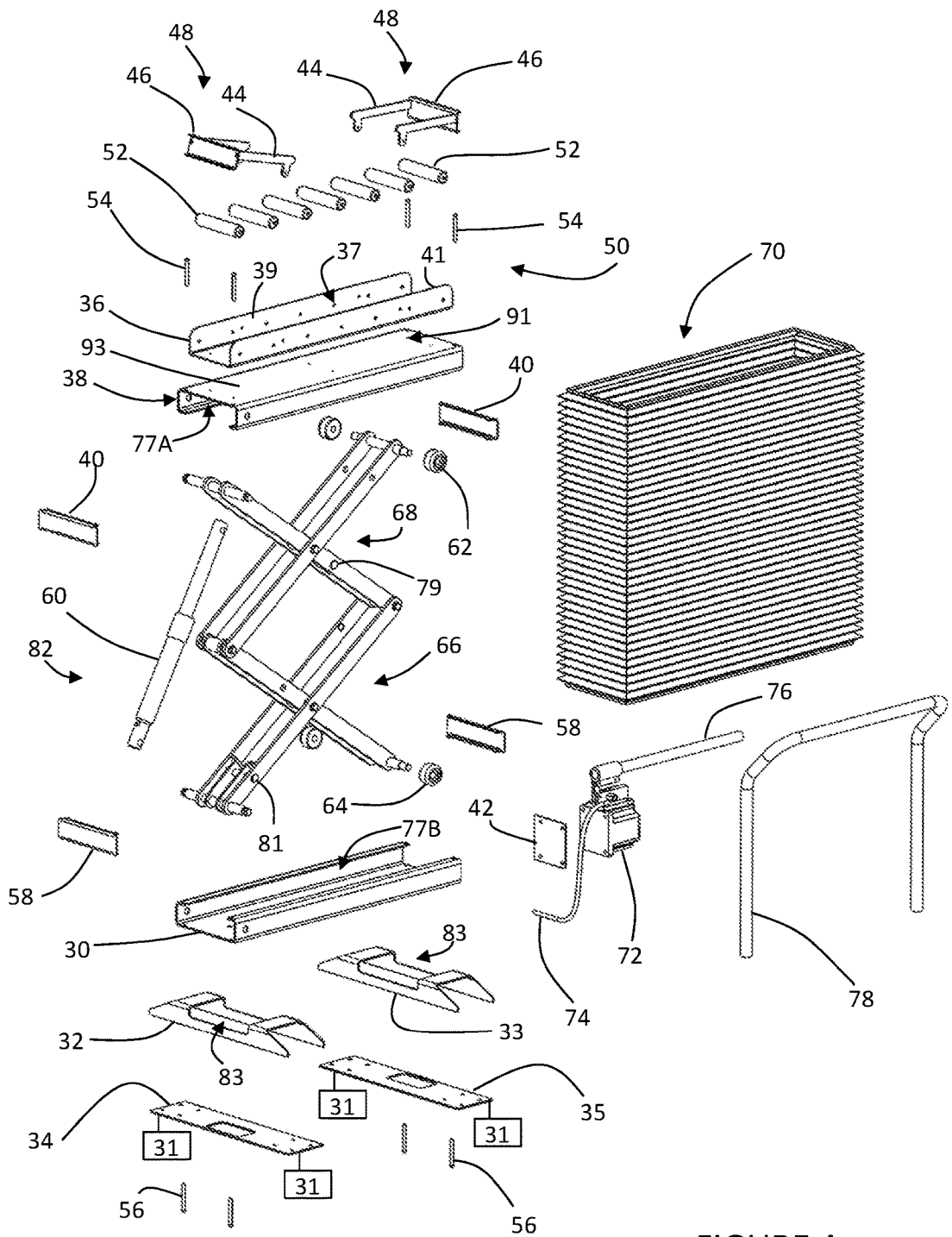
FIG. 4 depicts a perspective exploded view of an ergonomic die cart according to one or more embodiments shown and described herein.
Figure 17:
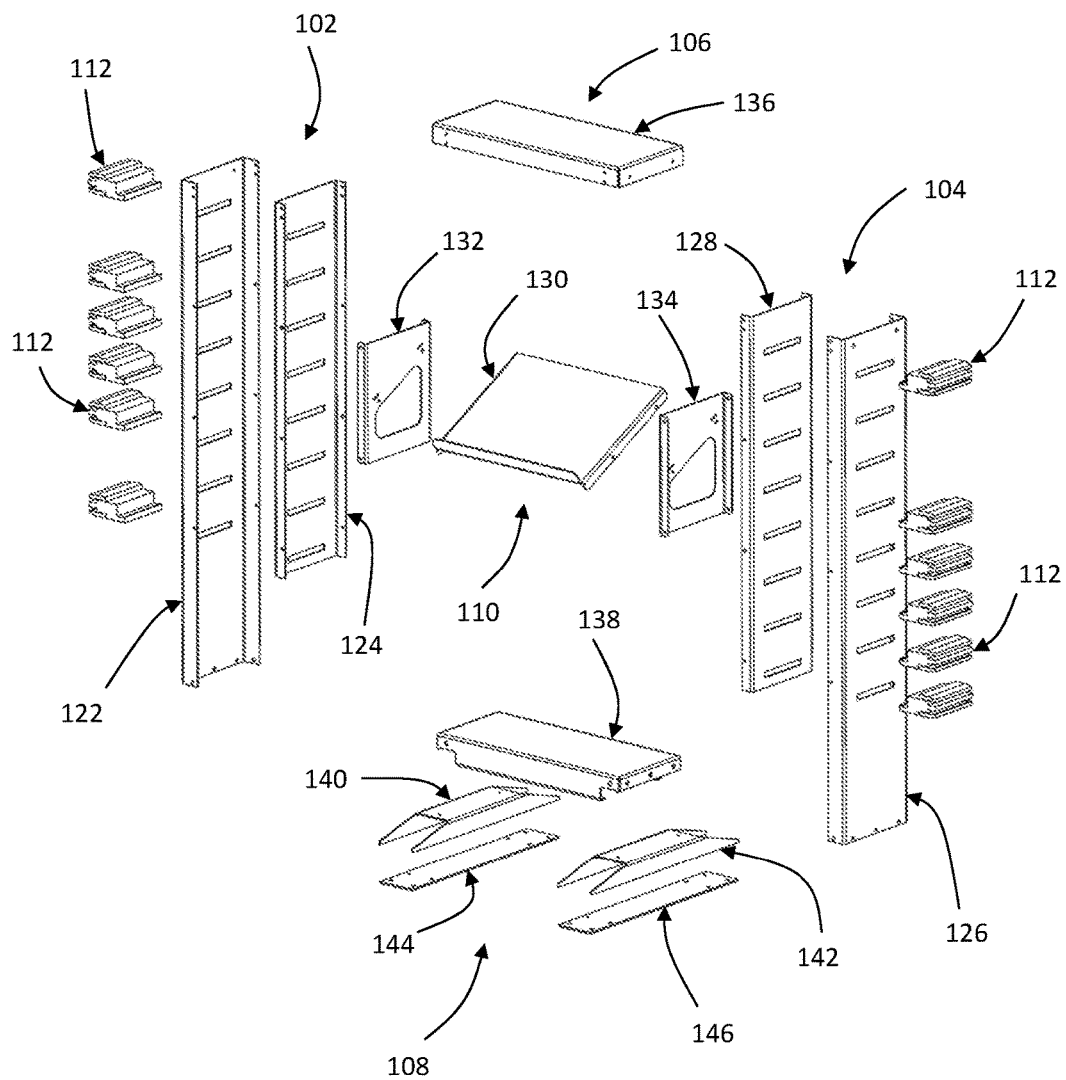
FIG. 17 depicts an exploded perspective view of a clamp rack system according to one or more embodiments shown and described herein.

As illustrated in FIG. 4, first base leg 32 and second base leg 33 reside generally perpendicular to and are fixed to respective ends of lower main frame 30. In some embodiments, such as FIG. 4, base legs 32, 33 have pockets 83 for a lower main frame 30 to rest. In this embodiment the base legs are welded but may be fastened to lower main frame 30. In similar embodiments (FIG. 17), base legs are absent of pockets.

In preferred embodiments a die cart includes a bellows 70 extending between a carrier frame 50 and lower frame assembly 80. Bellows 70 is fully capable of compressing and extending as the distance between carrier frame 50 and lower main frame 30 changes. Bellows 70 serves to eliminate accidental injury by blocking the user or other materials from the internal elevation mechanisms. In some forms, the die cart may comprise lockable casters 31 for mounting at each end of caster plate 34, 35 or other activated braking mechanism (not shown) to prevent unintentional rolling of the cart when parked at a predetermined location.

A preferred method of use of a die cart may include the following steps. Brakes are released and the user grasps the handle to move the die cart to the press such that the die can be easily transferred to the die cart. A pump handle 76 is activated by the user to elevate the carrier frame 50 if needed so that the top surface of rollers 52 is aligned with the press surface where the die is located. If necessary, the user releases relief valve 24 thereby releasing hydraulic pressure consequently lowering scissors jack 82 until generally level with the press then closing relief valve. A gate 48 adjacent the press machine is moved from a closed gate 22 configuration to an open gate 20 configuration. The user then slides a die off the press and onto the rollers 52 until fully supported by the rollers. Gate 48 is then moved from an open gate 20 configuration to a closed gate 22 configuration. The user closes the opposing gate if not already closed. The user grasps handle 78 and moves the die cart to and aligned with a die storage rack. The user again adjusts the height of the carrier frame to align with the storage height of the die. The gate 48 adjacent the storage rack is moved from a closed gate 22 configuration to an open gate 20 configuration. The user then guides the die across the rollers and slides it to a storage rack. The user again grasps the handle of the die cart and moves it such that the top of rollers 52 are aligned with the next needed die on the rack. The user then adjusts the height of the carrier frame as previously described to match the die. The user then slides the die across the rollers 52 thereby loading the die on the carrier frame 50. The user then moves gate 48 from an open gate 20 configuration to a closed gate 22 configuration. Brakes and other stops are released and the die cart is moved by the user to the press to unload the die following the same steps described above.

In some forms, a die cart, preferably adjustable in height, is configured with a tumbler portion for eased loading and unloading of machine tooling between a storage cart and machine. Once a tool is loaded into a tumbler, the tumbler has the capability to re-orientate the tool in space for loading into a machine in one orientation and loading on a storage rack in another orientation. For example, a tool may be inverted whereby these orientations differ by 180 degrees.

Figure 31:
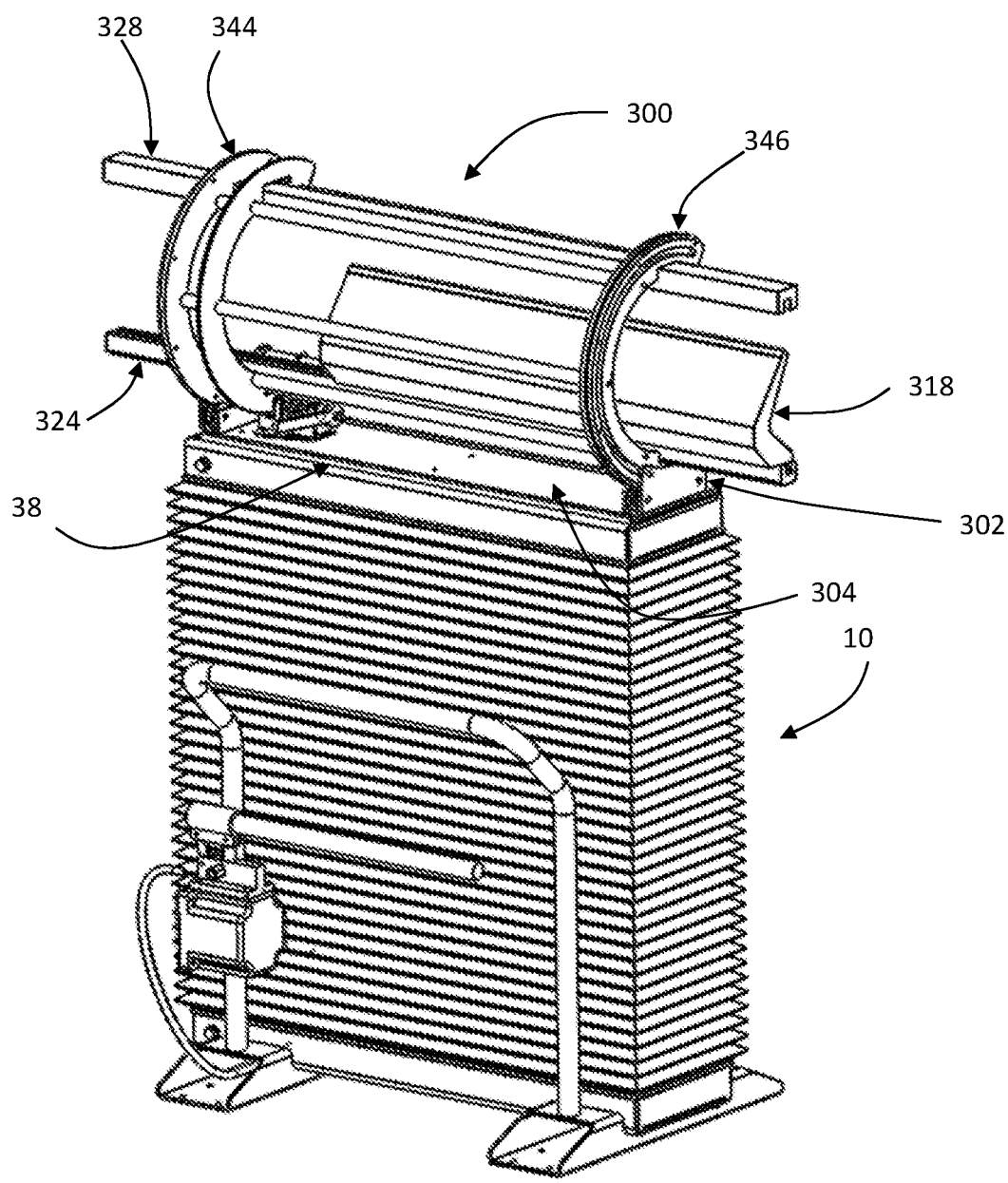
FIG. 31 depicts a top perspective view of a die cart with tumbler portion according to one or more embodiments shown and described herein.
Figure 34:
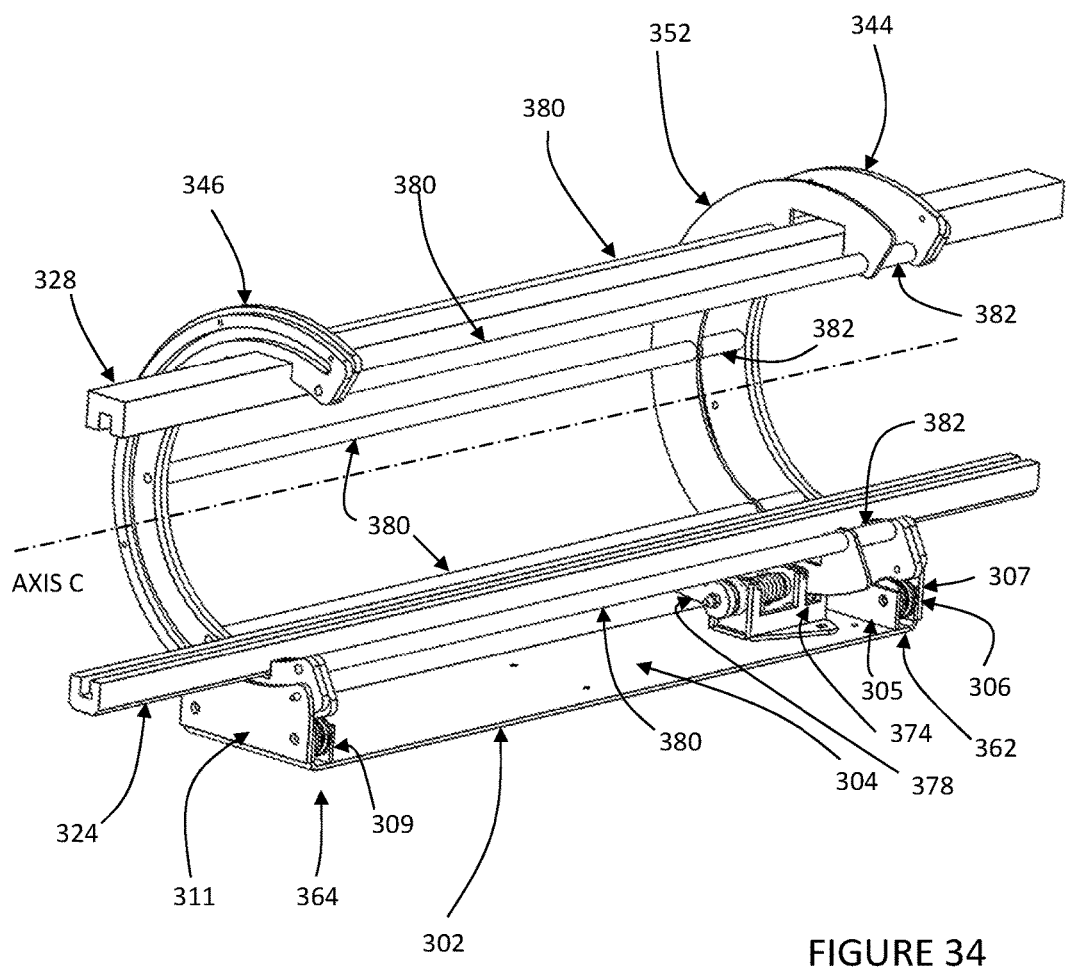
FIG. 34 depicts a perspective view of a tumbler portion utilizing rotary rings according to one or more embodiments shown and described herein.
Figure 35:
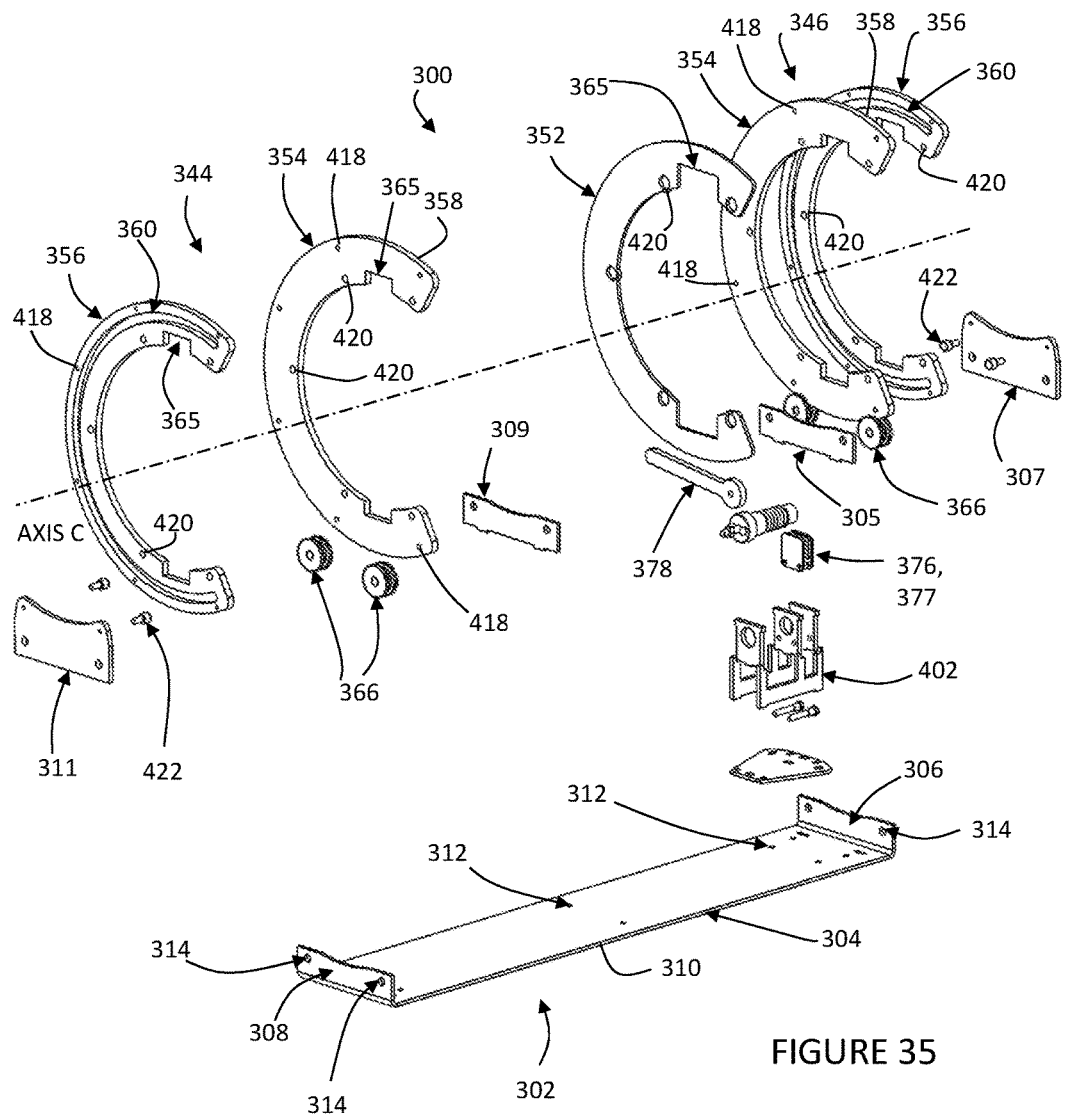
FIG. 35 depicts an exploded perspective view of a tumbler utilizing rotary rings according to one or more embodiments shown and described herein.

In a preferred embodiment, a tumbler 300 is mounted to a superior surface on an adjustable height cart. For example, the cart 10 illustrated in FIG. 1-5 may be used (illustrated with caster wheels removed). Carrier frame 50, gates 48, and rollers 52 on cart 10 are removed to expose upper main frame 38 with mount surface 93 superiorly and mount holes 91 extending through mount surface 93 for securing components. Tumbler 300 is mounted using bracket 302 as illustrated in FIGS. 31, 34, and 35. Bracket 302 comprises an elongate bracket wall 304 with opposed upstanding first support wall 306 and second support wall 308.

Figure 32:
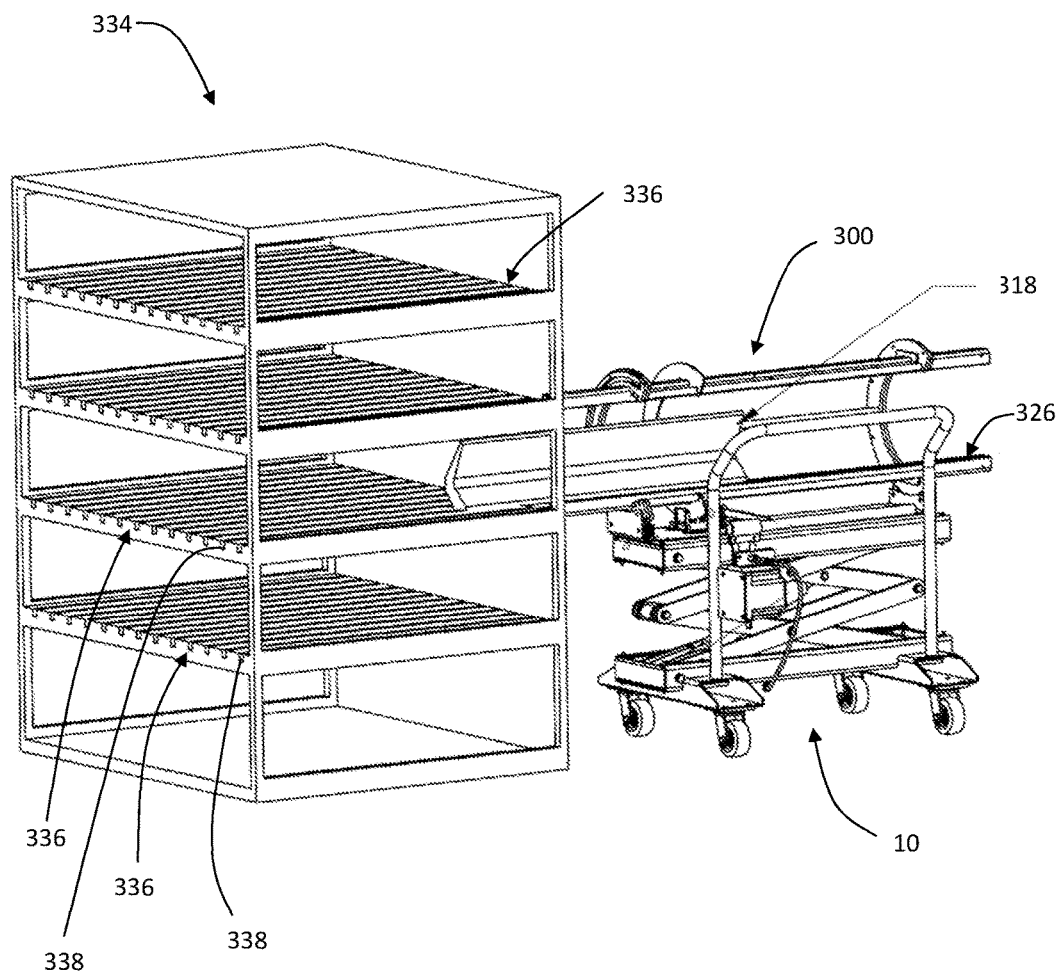
FIG. 32 depicts a top perspective view of a punch being transferred between a punch storage rack and first punch rail of a tumbler portion according to one or more embodiments shown and described herein.
Figure 33:
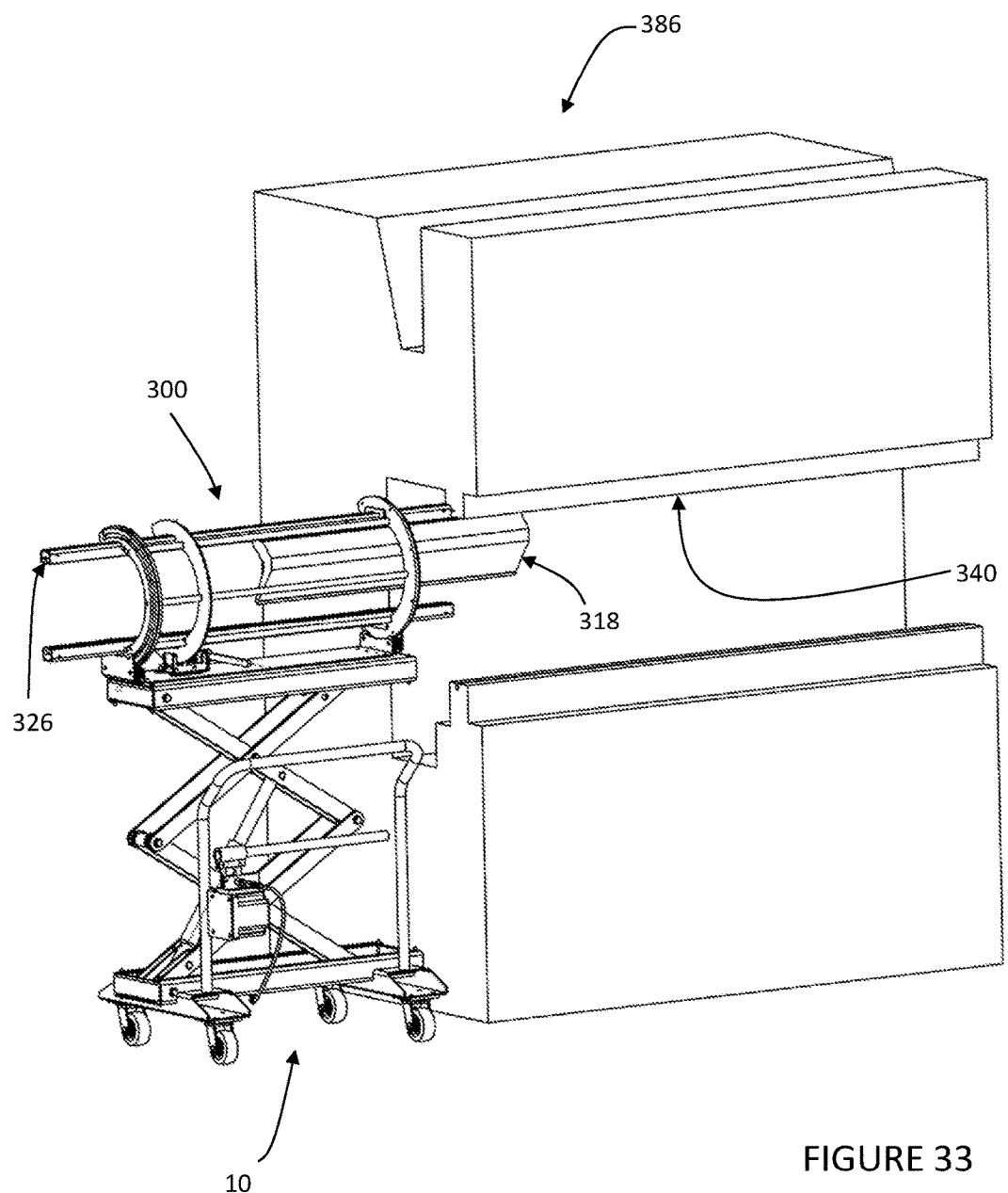
FIG. 33 depicts a front perspective view of a punch being transferred between a first punch rail of a tumbler portion and tool channel of a sheet metal press brake according to one or more embodiments shown and described herein.
Figure 39:
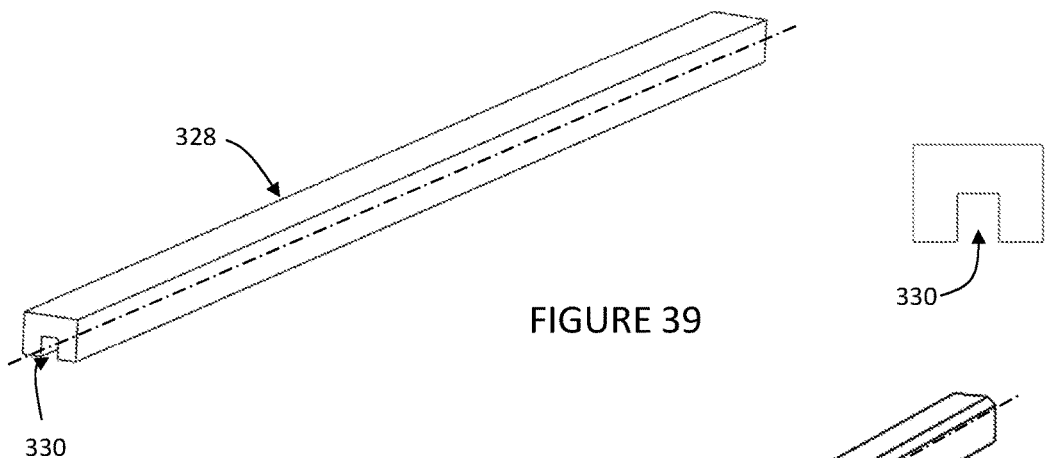
FIG. 39 depicts a perspective and end view of a second punch rail according to one or more embodiments shown and described herein.
Figure 40:
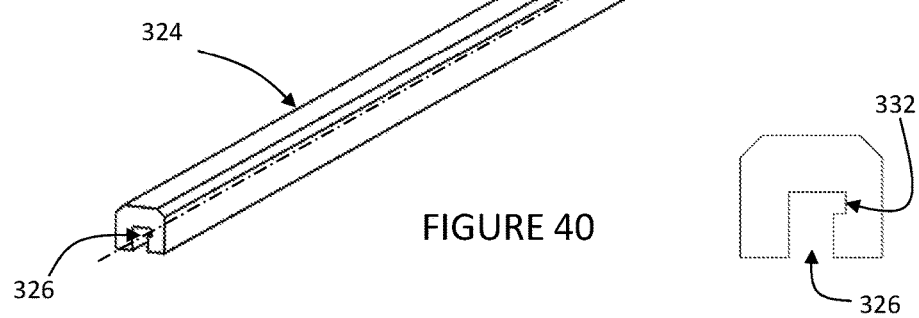
FIG. 40 depicts a perspective and end view of a first punch rail according to one or more embodiments shown and described herein.
Figure 41:
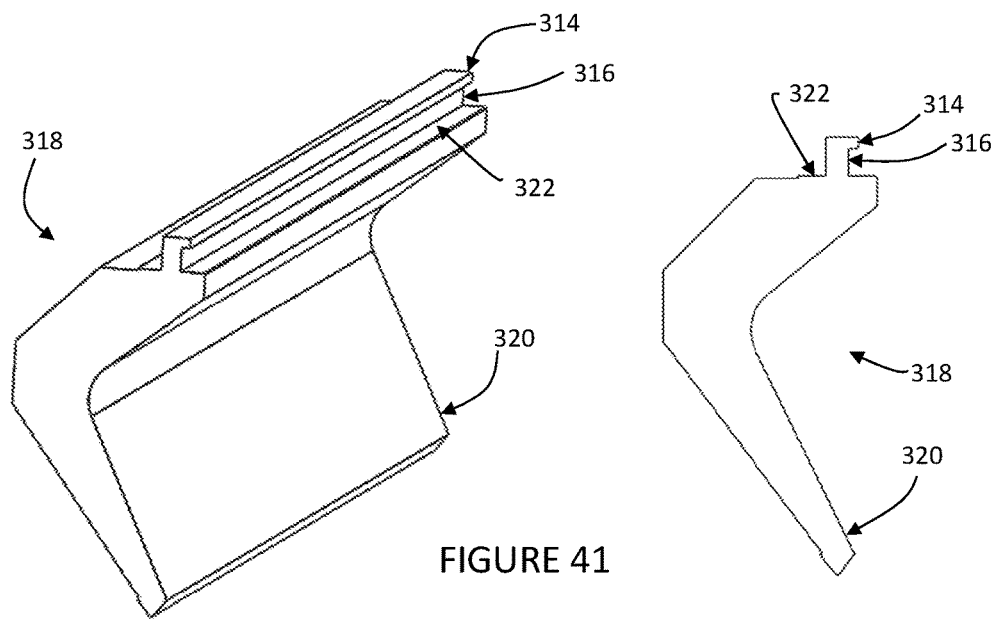
FIG. 41 depicts a perspective and end view of a punch according to one or more embodiments shown and described herein.

In one embodiment, a tumbler 300 is configured to secure a punch tongue 316 within a first punch channel 326 of a first punch rail 324 (FIG. 40). An example of one style of punch is illustrated in FIG. 41 in perspective and from an end view on the right. In another embodiment, tumbler 300 is configured to secure a punch foot 320 within a second punch channel 330 of a second punch rail 328 (FIG. 39). When tooling such as punches are not utilized in a machine, the tooling is often stored on a rack such as rack 334 illustrated in FIG. 32. In a storage configuration on rack 334, cart 10 height is vertically adjusted and a first punch channel 326 is configured to align with a rack channel 338 disposed on a punch shelf 336 for sliding movement transition of a punch 318 therebetween. In a load configuration such as illustrated in FIG. 33, cart 10 height is vertically adjusted and first punch channel 326 is configured to align with a tool channel 340 on a sheet metal press 386 for sliding movement transition of a punch 318 therebetween. Tumbler 300 is hand rotated by a user generally 180-degrees during movement in this embodiment when changing between a storage configuration and a load configuration.

In one form, a tumbler 300 comprises a first rotary ring 344 and an opposed second rotary ring 346. As illustrated in the embodiment in FIG. 34, a first punch rail 324 extends between two rotary rings 344, 346. Tumbler 300 may also include a second punch rail 328 also extending between rotary rings 344, 346.

As the embodiment in FIG. 31 illustrates, a first rotary ring 344 is situated generally at one end of a superior surface of an adjustable height cart 10 and second rotary ring 346 is situated over an opposed end of a superior surface of an adjustable height cart 10. It is preferred that terminal ends of first punch rail 324 and second punch rail 328 (if present) extend beyond the width of cart 10 such that cart 10 can be steered to align and position adjacent punch rails 324, 328 with complementing rails on a punch storage rack 334 or machine such as a sheet metal press brake 386.

In this embodiment, ring brake 352 is situated above a superior surface of an adjustable height cart 10. An elongate axis of a first punch channel 326 and an elongate axis of a second punch channel 330 are orientated generally horizontal. A first rotary ring 344 and a second rotary ring 346 stand generally vertical as illustrated in FIG. 31.

In this embodiment, a rotary ring 344, 346 comprises a plate portion 354 and a groove portion 356 that are secured together by fasteners, welds, or other methods. In alternative embodiments, plate portion 354 and groove portion 356 are manufactured from a singular material piece. Plate portion 354 of a rotary ring 344, 346 comprises an outer radial surface 358 for riding on rotary glides 362, 364.

Here, groove portion 356 of a rotary ring 344, 346 comprises a guide portion illustrated here in the form of an enclosed curvilinear groove 360 inset the groove portion 356. Curvilinear groove 360 is sufficient to house end stop 422 here in the form of the head of a shoulder screw sized to extend into and glide within curvilinear groove 360. A threaded end of each end stop 422 threads into first lateral plate 307 and second lateral plate 311. End stop 422 prevents further rotation of rotary ring 344, 346 when the head of end stop 422 abuts one of the terminal ends of curvilinear groove 360 providing at least 180 of free rotation. End stop 422 also holds rotary ring 344, 346 adjacent rollers 366 to prevent undesired separation from bracket 302.

Ring holes 418 may be present through plate portion 354 and groove portion 356 for alignment and passage of fasteners and in some cases for securing these parts during manufacturing. Ring holes 418 may be threaded. Stabilizer holes 420 may also be present for alignment and for the locking of one or more first stabilizers 380 and one or more second stabilizers 382 between rotary rings 344, 346 to create a rigid structure rotating about first and second rotary glides 362, 364. Rail captures 365 may be aligned and cut in rotary rings 344, 346 and ring brake 352 for securement of punch rails 324, 328 therein.

In this embodiment, first rotary ring 344 and a second rotary ring 346 are supported on first rotary glide 362 and a second rotary glide 364 spaced from the first rotary glide 362. First lateral plate 307 and first medial plate 305 are sufficiently spaced to fit first rotary glide 362 therebetween. Similarly, second lateral plate 311 and second medial plate 309 are sufficiently spaced to fit second rotary glide 364 therebetween. In this embodiment, each rotary glide 362, 364 is in the form of two or more spaced rollers 366 supported by a roller shaft (not shown) extending between aligned holes in each plate pair. In this embodiment, lateral plates 307, 311 and medial plates 305, 309 are orientated vertically and fixed to bracket 302 as illustrated in FIGS. 34-35 (FIG. 35—stabilizers removed). In some embodiments, sheet metal parts are manufactured with tabs for fit into precut grooves in various parts to assure alignment and welding. In alternative forms, first and second rotary glide 362, 364 is in the form of a low friction surface such as a polymer for low friction sliding contact with outer radial surface 358.

Figure 36:
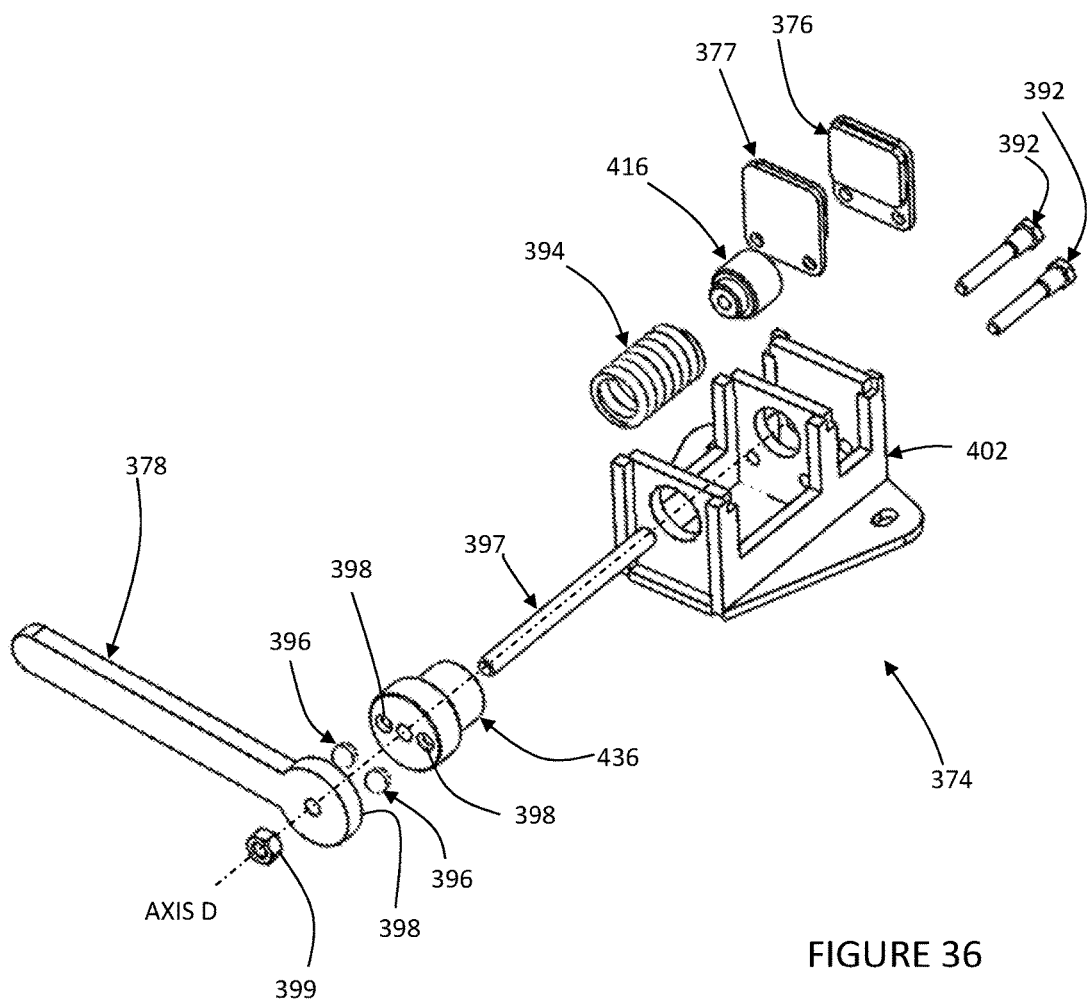
FIG. 36 depicts an exploded perspective view of a brake caliper according to one or more embodiments shown and described herein.
Figure 37:
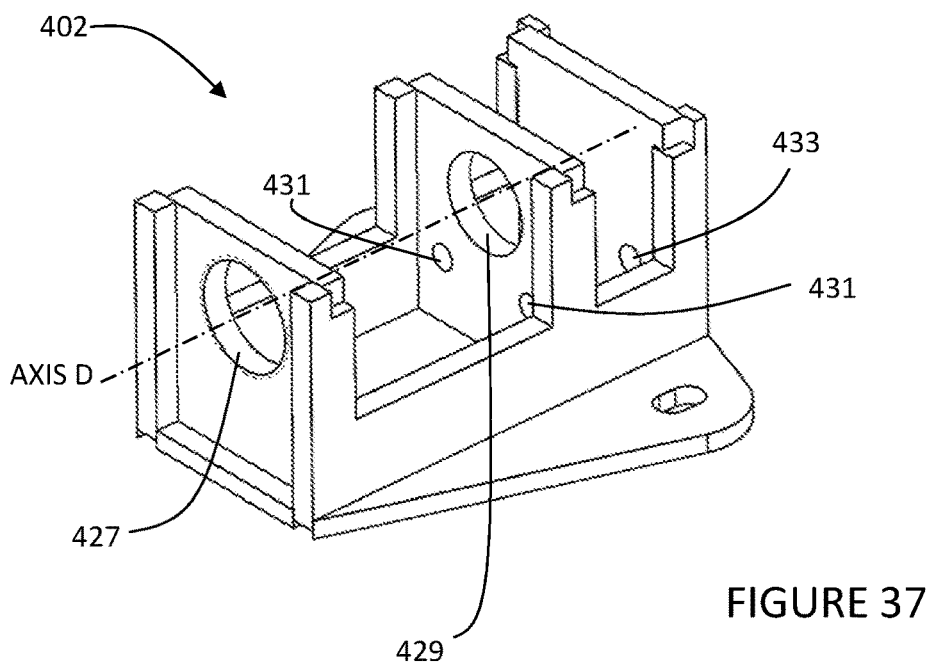
FIG. 37 depicts a perspective view of a brake housing according to one or more embodiments shown and described herein.
Figure 38:
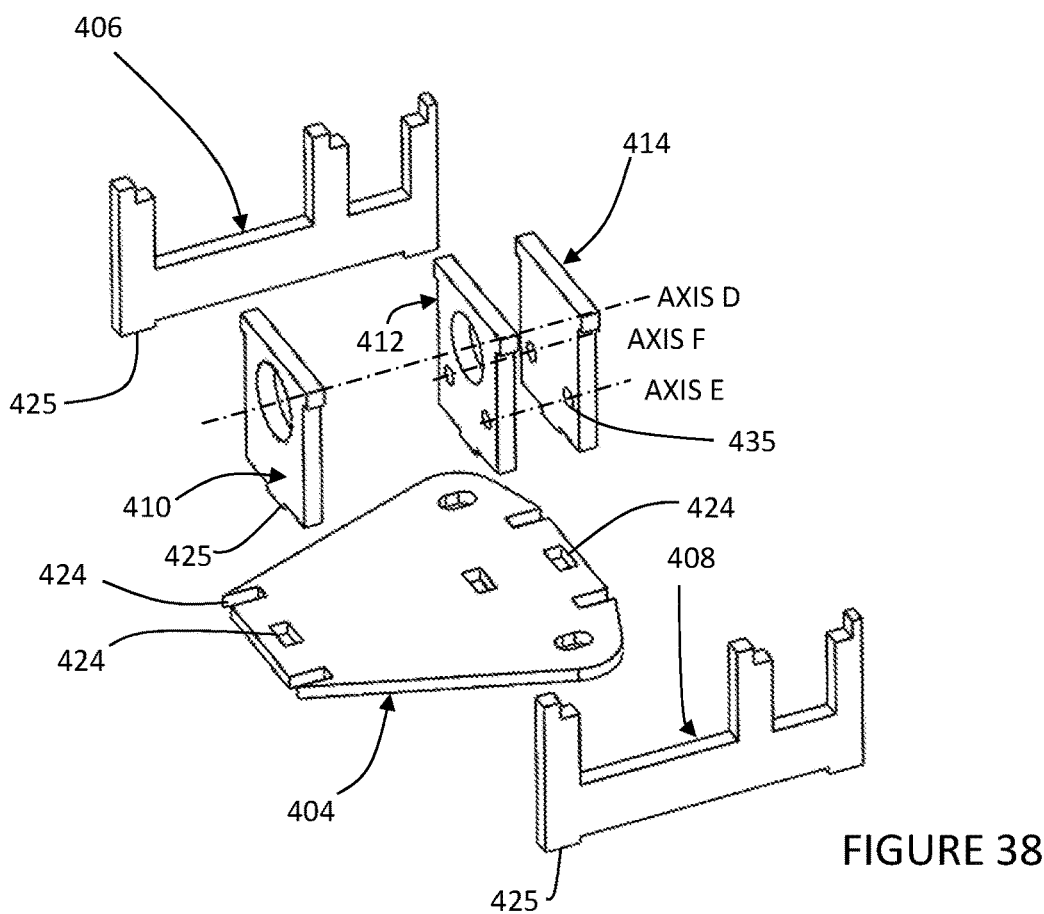
FIG. 38 depicts an exploded perspective view of a brake housing according to one or more embodiments shown and described herein.

In preferred embodiments a braking system is used to control rotation of tumbler 300. FIG. 36 illustrates one example of a brake caliper 374 in an exploded view. In this embodiment, brake caliper 374 is secured to lower tumbler bracket 302 through a series of aligned holes extending therebetween for the occupation of fasteners however welds may be used. A brake housing 402 may be used to house assorted components of brake caliper 374. Brake housing 402 may be formed using a variety of methods including from a single block of material or by welded assembly of a plurality of smaller sheet metal components as illustrated in FIGS. 37 and 38. In this embodiment, a housing bottom 404 is notched to receive tabs 425 for alignment and strength during assembly. A first housing wall 406 is spaced from a second housing wall 408 and situated into notches 424 and oriented generally perpendicular to housing bottom 404. A first intermediate wall 410, second intermediate wall 412, and third intermediate wall 414 are also aligned with the appropriate notches and placed vertically and generally perpendicular between first housing wall 406 and second housing wall 408. Each wall is secured to abutting walls using welds. First restraint holes 431 in second intermediate wall 412 is aligned along axis E and F with second restraint holes 433 in third intermediate wall 414. In addition, first intermediate hole 427 is aligned along axis D with second intermediate hole 429 to prevent binding in the operational braking assembly.

As illustrated in FIG. 36, pad restraints 392 comprise; a drive head for advancing with a tool into a threaded second restraint hole 433, a threaded neck, and a smooth elongate body for sliding interface with complementing brake apertures 435 to secure first and second brake pads 376, 377 between second and third intermediate wall 412, 414. Brake piston 416 extends through second intermediate hole 429 to apply force to second brake pad 377 creating a frictional stop on ring brake 352. Piston 416 comprises a seat adjacent bias member 394. Brake shaft 397 is operatively connected to piston 416 and extends through drive pod 436 before securing to brake handle 378 and locked in position using nut 399. Drive interface 396, here in the form of bearing members, engage drive faces 398 and handle 378 and drive pod 436 to apply braking force applied by the user through handle 378.

In a stopped configuration, a brake ring 352 is disposed within a brake caliper 374 to prevent movement thereof by the action of squeezing between a first brake pad 376 and second brake pad 377. In a free configuration, a brake ring 352 glides with low frictional resistance between first and second brake pads 376, 377 disposed within a brake caliper 374. In a control configuration, a brake ring 352 is squeezed sufficiently between opposed first brake pad 376 and second brake pad 377 disposed within a brake caliper 374 to provide a controlled rotation of a tumbler 300. Brake handle 378 is configured for activation of brake caliper 374 to change tumbler 300 between stopped, controlled, and free configurations.

In this embodiment, stabilizers add stability to a tumbler system. For example, as illustrated in FIG. 34, one or more first stabilizers 380 or one or more second stabilizers 382 or one or more first stabilizers 380 and second stabilizers 382 extend between one or more of the following; a first rotary ring 344, a second rotary ring 346, and a brake ring 352. Each stabilizer may be of a different length.

In one embodiment, a method of using an ergonomic cart 10 for eased transport of a machine tool such as a punch 318 between a machine tool storage rack 334 and a manufacturing machine such as a sheet metal press brake 386 comprises the following steps. Obtaining a movable cart 10 having an elevator portion for adjusting the height of a tumbler portion 300 and wherein said tumbler portion comprises a punch rail 326 having a generally horizontal first punch channel 326 extending along the length of the punch rail. Adjusting the height of said elevator portion. Setting the tumbler 300 to a storage configuration wherein a first punch channel 326 is configured to generally align with a rack channel 338 on a storage rack 334. Sliding a machine tool (punch 318) from said rack channel 338 on the storage rack 334 into the first punch channel 326 on said tumbler 300. Moving the ergonomic cart from the machine tool storage rack 334 to a manufacturing machine such as a sheet metal press brake 386. Setting the tumbler 300 to a load configuration wherein said first punch channel 326 is rotated generally 180 degrees. Adjusting the height of said elevator portion. Aligning said first punch channel 326 with a tool channel 340 on a manufacturing machine. Sliding the machine tool (punch 318) from said first punch channel 326 into said tool channel 340. Moving the ergonomic cart 10 away from the manufacturing machine. The step of transitioning the tumbler between storage configuration and a load configuration may include the step of rotating one or more rotary rings.

Figure 42:
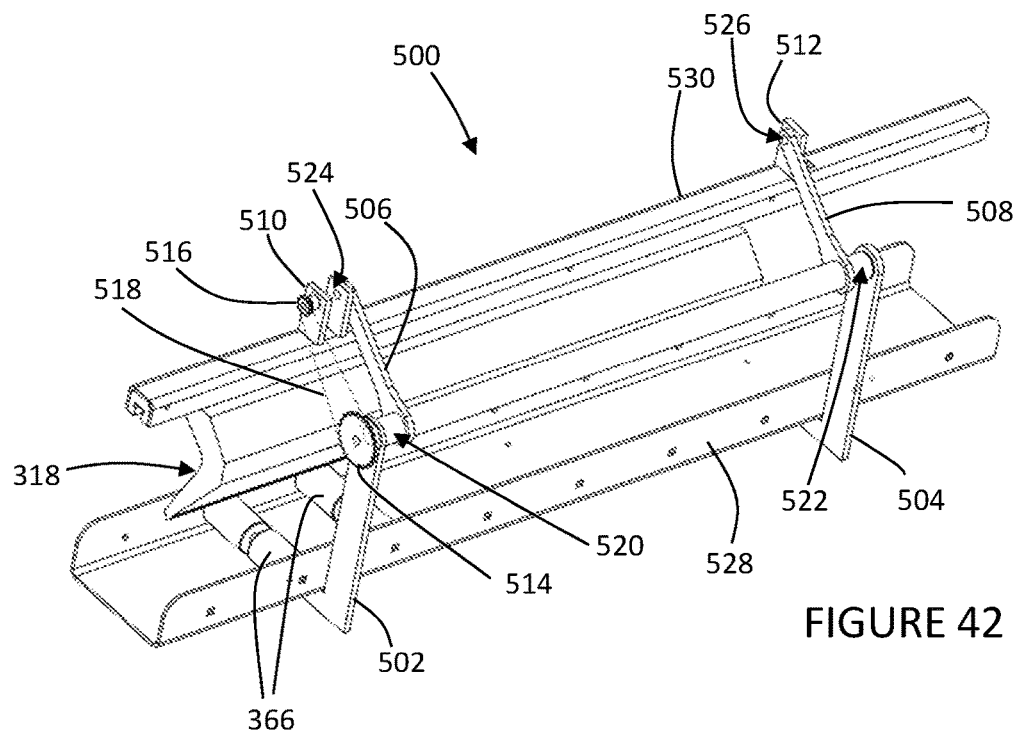
FIG. 42 depicts a top perspective view of a linkage based tumbler according to one or more embodiments shown and described herein.
Figure 43:
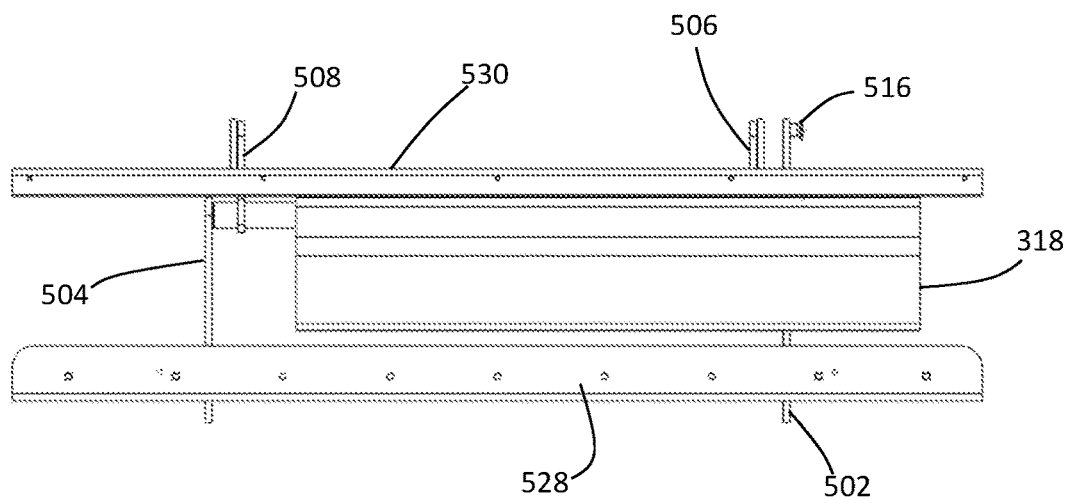
FIG. 43 depicts a side view of a linkage based tumbler according to one or more embodiments shown and described herein.

In an alternative embodiment, an ergonomic cart has a linkage tumbler portion 500 comprising a first linkage support arm 502 and a second linkage support arm 504 each extending from a carrier frame (see 50 in previous embodiments). In this embodiment, a first driven arm 506 is pivotably attached at a first pivot 520 to said first linkage support arm 502. In addition, a second driven arm 508 is pivotably attached at a second pivot 522 to said second linkage support arm 504. A first driven link 510 is pivotably attached at a third pivot 524 to an end of a first driven arm 506. A second driven link 512 is pivotably attached at a fourth pivot 526 to an end of said second driven arm 508. A horizontal linkage punch rail 530 extends between a first driven link 510 and a second driven link 512. A first sprocket 514 is aligned with said first pivot 520 whereas a second sprocket 516 is aligned with a third pivot 524. The first sprocket 514 and a second sprocket 516 are coupled by a chain 518. In some forms, a linkage punch rail resides over rollers 366 and a load carrier 528 as illustrated in FIG. 42.

Figure 44:
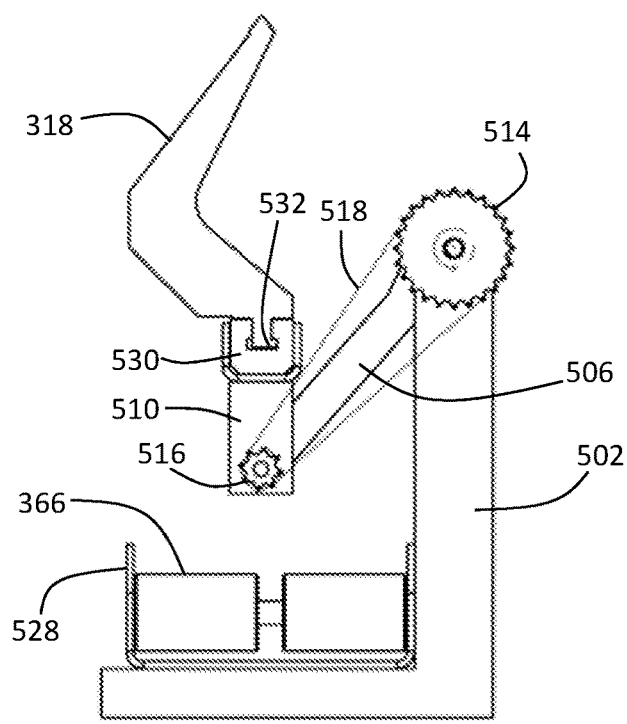
FIG. 44 depicts an end view of a linkage based tumbler with punch channel facing superiorly according to one or more embodiments shown and described herein.
Figure 45:
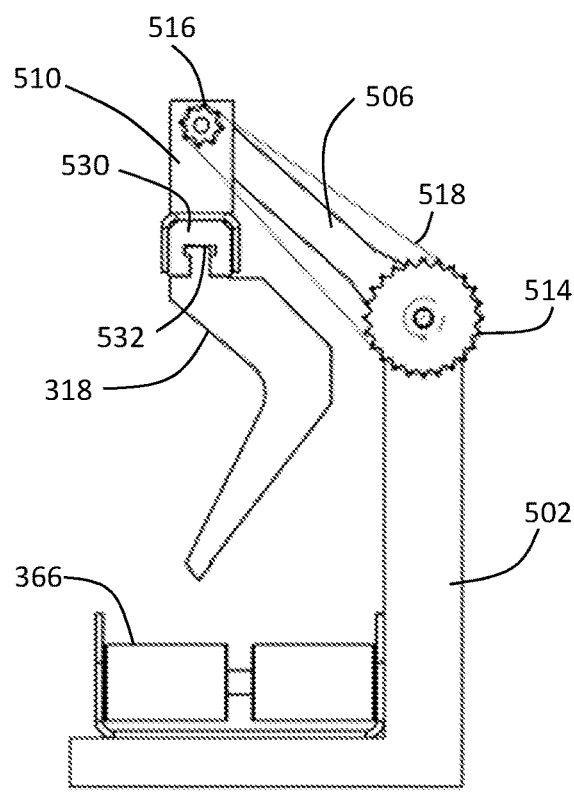
FIG. 45 depicts an end view of a linkage based tumbler with punch channel facing inferiorly according to one or more embodiments shown and described herein.

In this embodiment, rotation of chain 518 and first sprockets 514 and second sprocket 516 causes punch channel 532 to face superiorly as illustrated in FIG. 44 in a storage configuration and to face inferiorly as illustrated in FIG. 45 in a load configuration.

Press clamps are also very heavy. Clamp rack systems are disclosed offering mobile and convenient cart systems for storing, retrieving, and organizing press clamps while minimizing the ergonomic challenges while using the press clamps in a manufacturing environment.

A preferred embodiment of an ergonomic cart in the form of a clamp rack system is illustrated in FIGS. 14 and 16-24. In this embodiment a mobile clamp rack system comprises a first column 102 and an opposing second column 104. Each column 102, 104 comprises at least a slotted first strut but preferably a slotted strut pair comprising a first outer strut 122, 126 and a first inner strut 124, 128 to capture and hold clamps 112 providing for easy insertion or removal of a clamp from a slot corridor 194.

Figure 15:
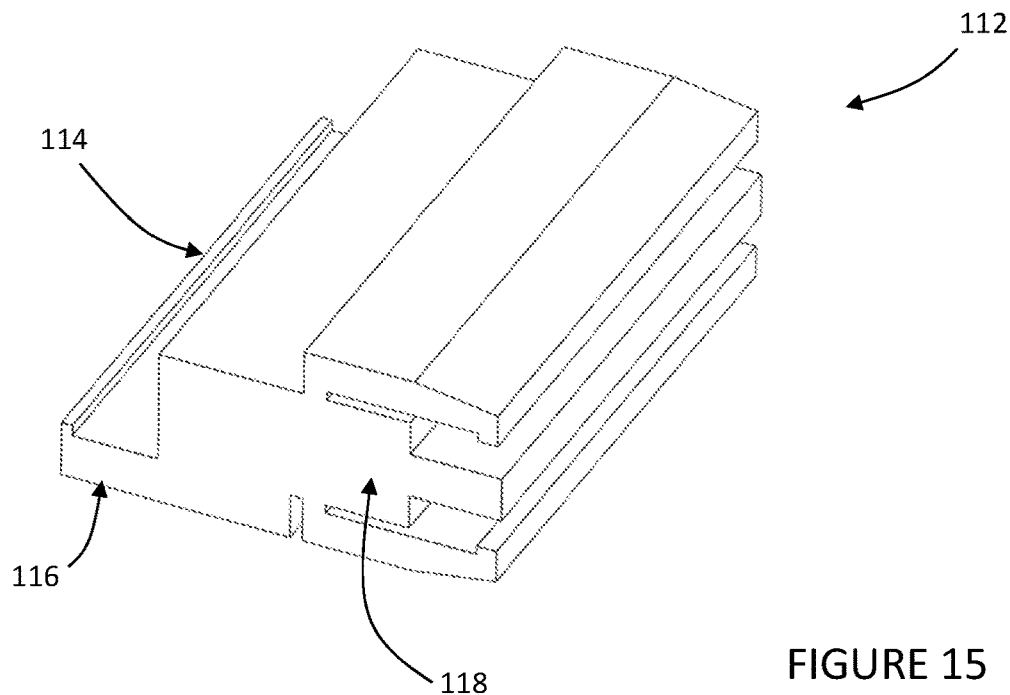
FIG. 15 depicts a perspective view of a clamp usable in a clamp rack system according to one or more embodiments shown and described herein.
Figure 16:
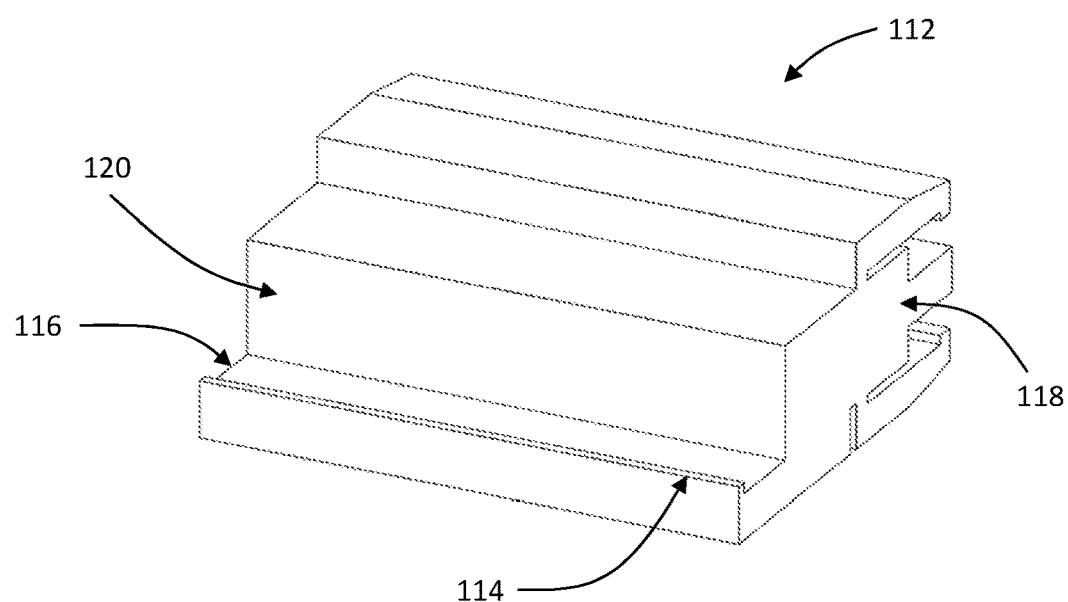
FIG. 16 depicts a perspective view of a clamp usable in a clamp rack system according to one or more embodiments shown and described herein.

In one form a clamp 112 (FIG. 15-16) comprises a clamp body 118 and a clamp holder comprising a clamp tongue 116 extending from one side of the clamp body 118 and clamp retainer 114.

Upon inserting clamp tongue 116 into slot corridor 194 and as consequence of release of the clamp tool 112 by the user, the heavier clamp body portion 118 of clamp tool 112 causes the tool to pivot within slot corridor 194 causing clamp retainer 114 to interfere with an inner strut 124 or 128 surface to retain tool 112 within slot corridor 194.

Figure 19:
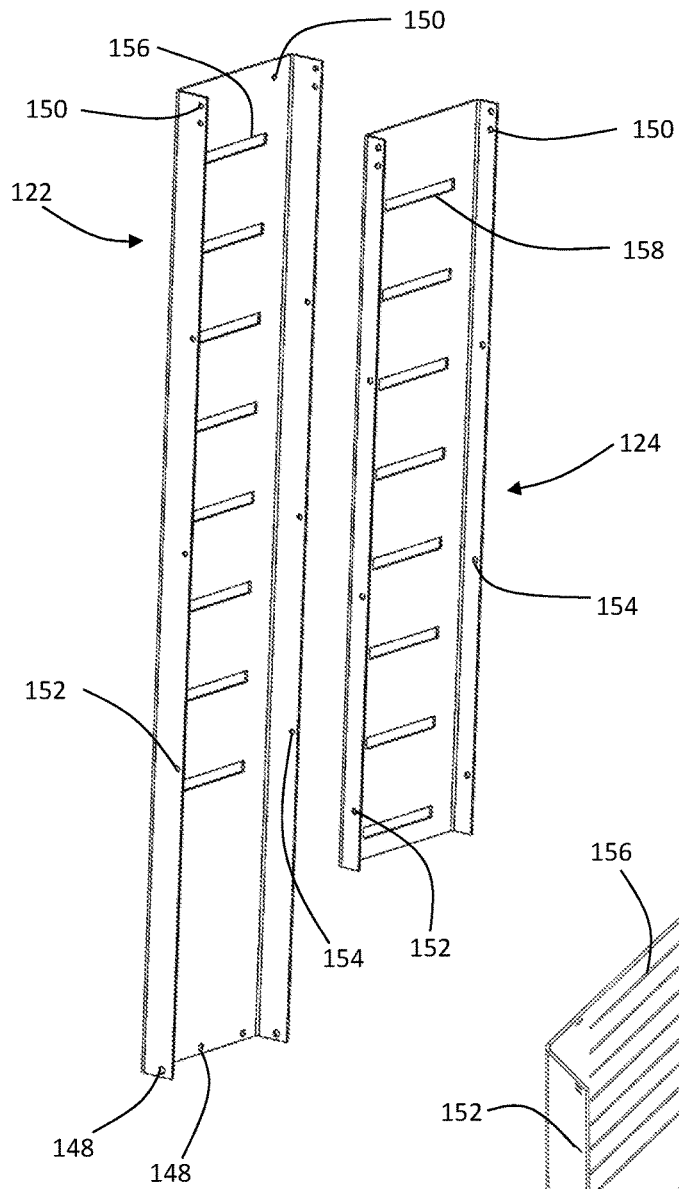
FIG. 19 depicts a perspective view of a first outer strut and a first inner strut of a clamp rack system according to one or more embodiments shown and described herein.
Figure 20:
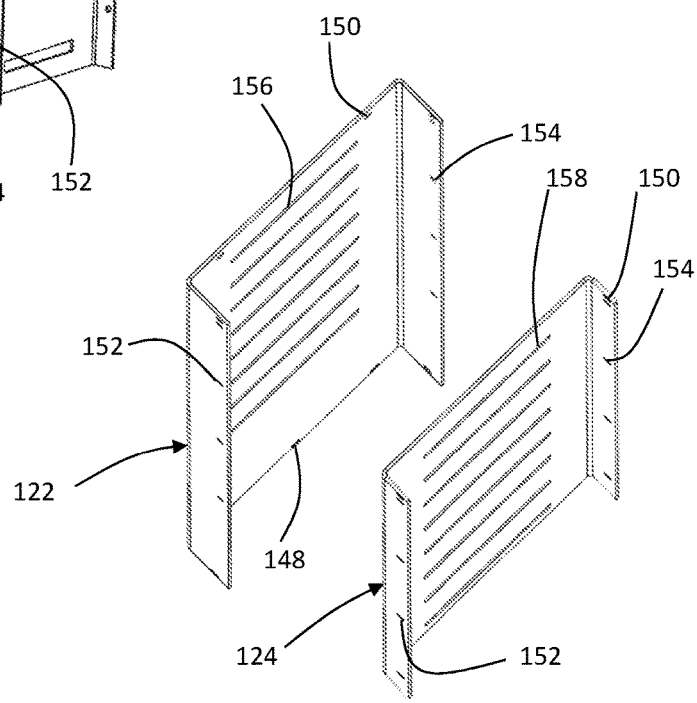
FIG. 20 depicts a perspective view of a first outer strut and a first inner strut of a clamp rack system according to one or more embodiments shown and described herein.

Removal is completed by tilting or sliding a clamp in or out of a slot corridor 194 formed by aligned outer clamp slots 156 and inner clamp slots 158 (FIG. 19-20). The clamps 112 are presented in a first outer clamp slot 156 such that they can be firmly gripped at both ends by the operator while moving the clamps 112 when standing next to the clamp rack assembly 100.

Figure 14:
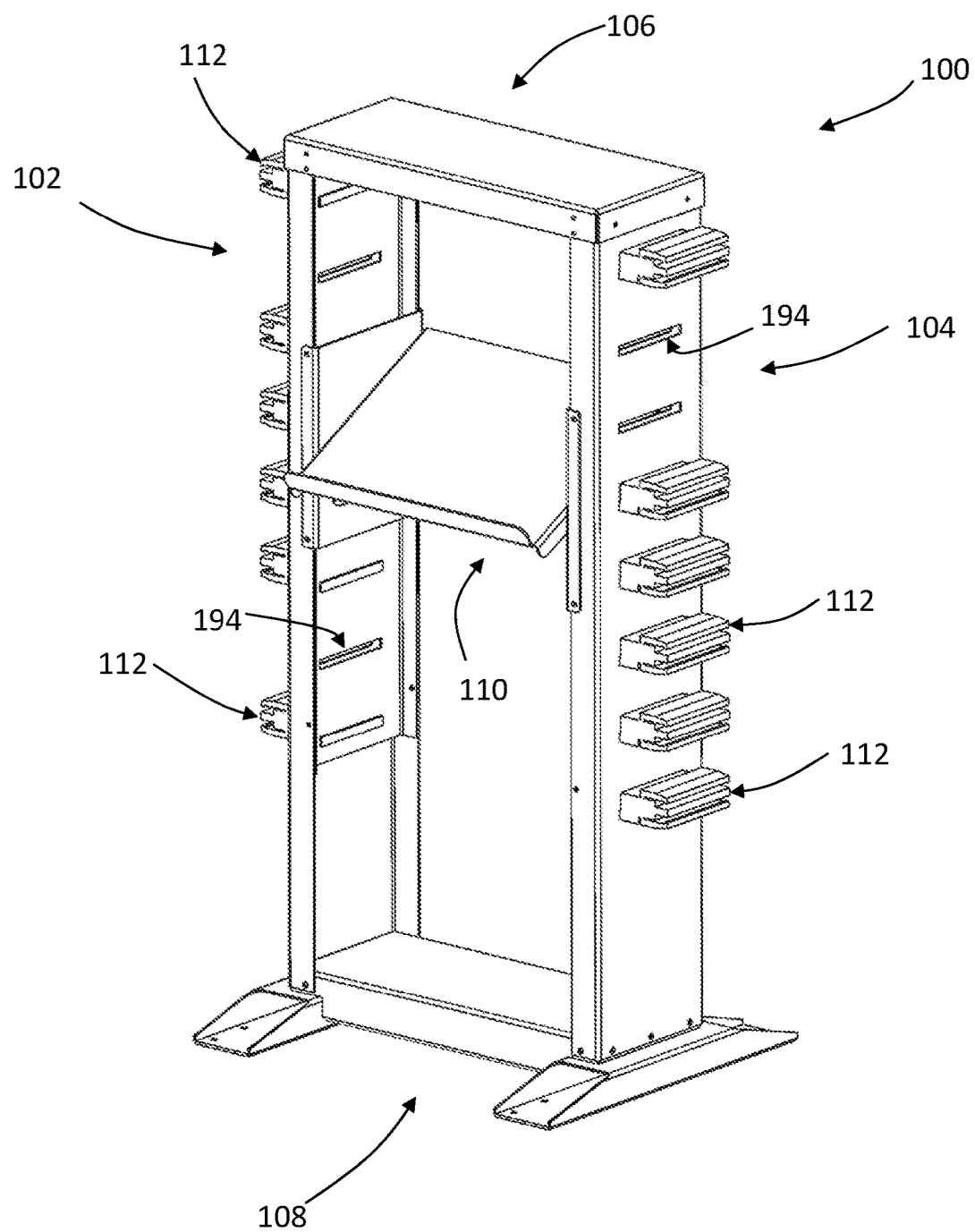
FIG. 14 depicts a perspective view of a clamp rack system according to one or more embodiments shown and described herein.

In the embodiment illustrated in FIG. 14, a clamp rack system 100 comprises an opposed first slotted column 102 and second slotted column 104. Each slotted column 102, 104 comprises an outer strut 122, 126 and respective inner strut 124, 128. For example, first column 102 (FIG. 17—exploded) comprises a first inner strut 124 housed within a first outer strut 122 and second column 104 comprises a first inner strut 128 housed within a first outer strut 126. The inner and outer struts comprise a series of aligned upper strut restraints 150, a series of aligned back strut restraints 154 and a series of front strut restraints 152 (FIG. 19). These aligned restraints are preferably in the form of holes for the passage of fasteners to secure the inner struts and outer struts together. Upon alignment of these aforementioned restraints, a series of opposed spaced slots are created. For example, outer clamp slot 156 is spaced from and aligned with inner clamp slot 158 creating a slot corridor 194 (FIG. 14) through which clamp tongue 116 is seated and held by clamp retainer 114.

In alternative embodiments, first and second column 102, 104 may be formed from a generally rectangular tube with a plurality of slot corridors therethrough rather than an inner and outer strut assembly.

As illustrated in the FIG. 14 embodiment, the first and second columns 102, 104 extend between a superior frame 106 and inferior strut 138. In this embodiment an inferior main frame 108 comprises a first base leg 140 and a second base leg 142 (FIG. 23-24) to provide stability to clamp rack assembly 100. The base legs 140, 142 include a corresponding first caster plate 144 and second caster plate 146 on which casters 31 are mounted to provide rolling mobility of rack system 100 by push of the user on one of columns 102, 104. As shown, caster plates 144, 146 may include threaded or non-threaded holes for alignment and fastening of casters 31. The casters 31 may be lockable or a braking mechanism may be included in the rack to limit unintentional moment of the rack system. Base legs 140, 142 are secured to inferior strut 138 which spans between first and second columns 102, 104. Inferior strut 138 comprises a top wall 189 and front wall 188 and rear wall 186 and opposing lateral walls 184. Forward leg recess 178 and rear leg recess 180 conform inferior strut 138 to partially wrap around corresponding legs 140, 142. Support flange 196 provides stiffness to inferior strut 138. A series of restraints in the form of holes through front wall 188, rear wall 186, and opposing lateral wall 184 align with corresponding lower strut restraints 148 on the first and second outer struts 122, 126. Welds may be utilized such as between the base legs 140, 142 and at the forward and rear leg recess 178, 180 intersections.

Figure 21:
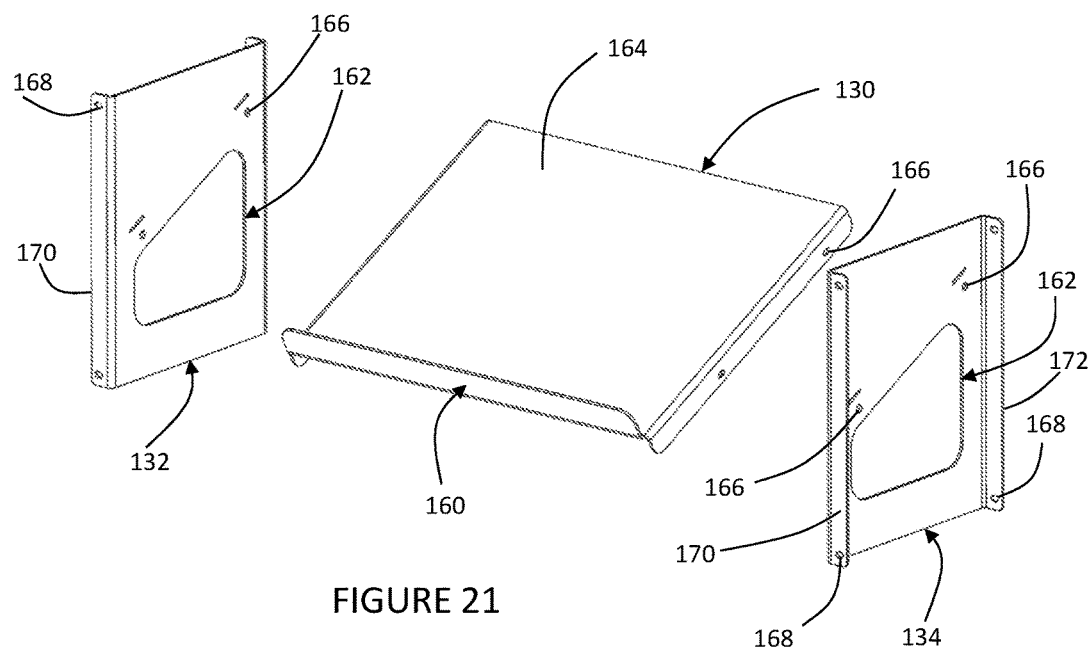
FIG. 21 depicts a top perspective view of a tray platform portion of a clamp rack system according to one or more embodiments shown and described herein.
Figure 22:
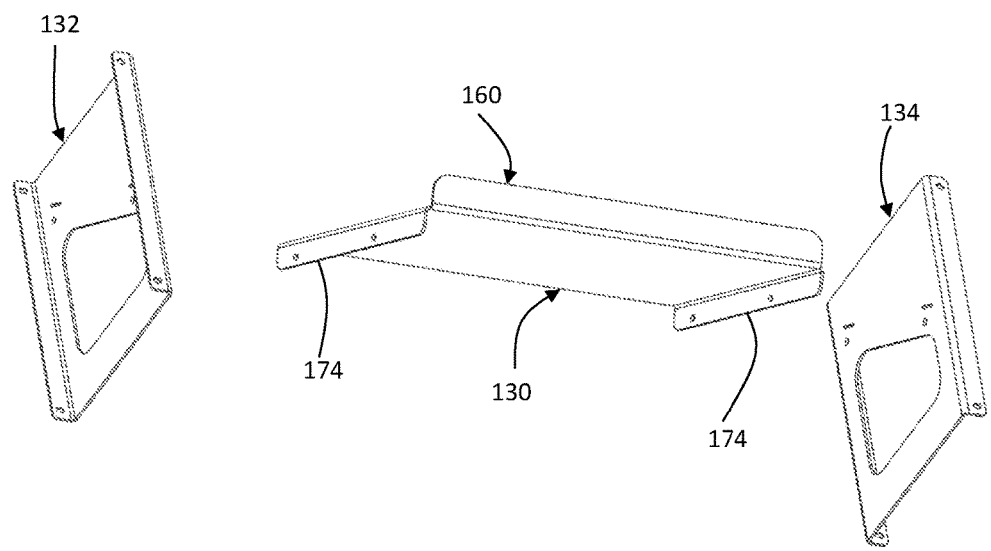
FIG. 22 depicts a bottom perspective view of a tray platform portion of a clamp rack system according to one or more embodiments shown and described herein.
Figure 23:
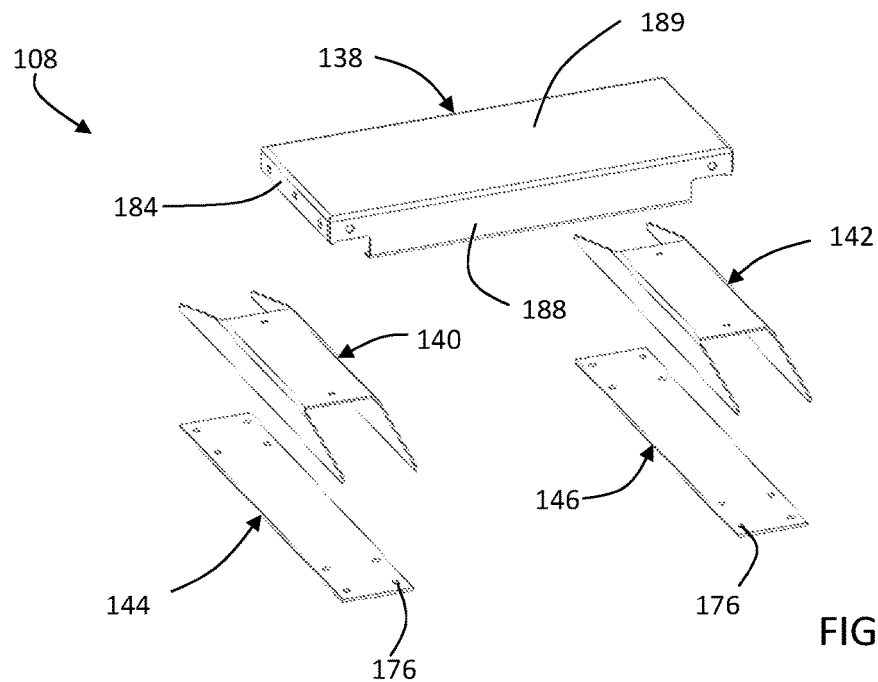
FIG. 23 depicts a top perspective view of an inferior main frame portion of a clamp rack system according to one or more embodiments shown and described herein.
Figure 24:
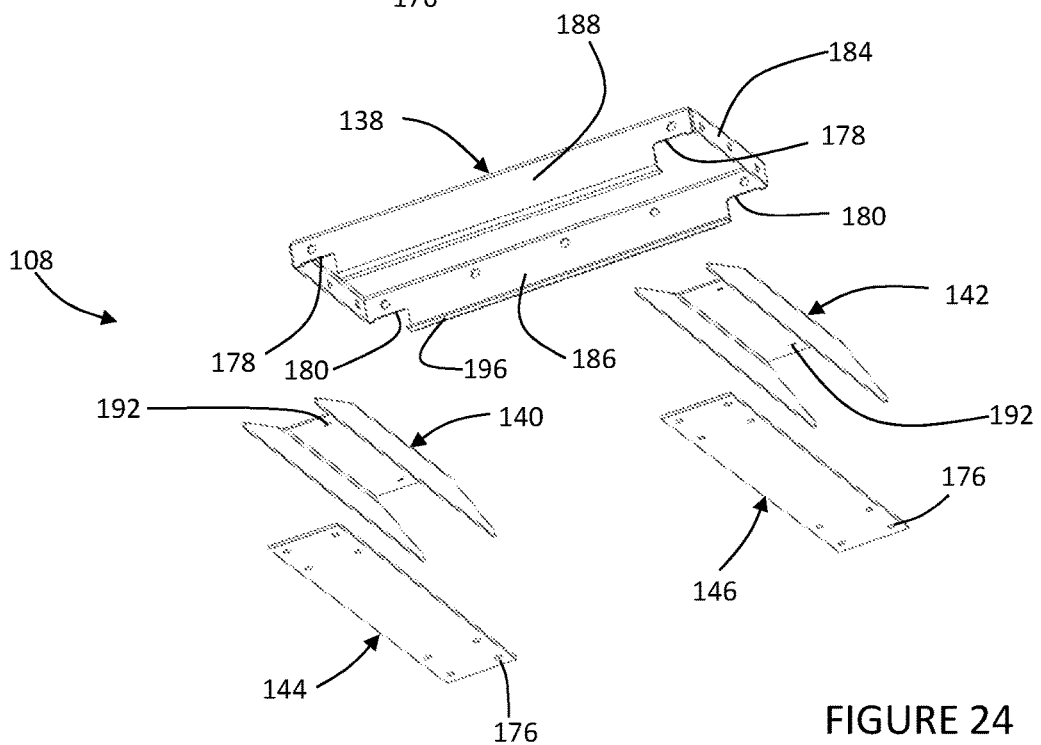
FIG. 24 depicts a bottom perspective view of an inferior main frame portion of a clamp rack system according to one or more embodiments shown and described herein.

In this embodiment, a tray assembly 110 as illustrated in FIGS. 21 and 22 is secured between opposed first and second columns 102, 104 and operable as a work surface for paper work, a lap top computer, tablet or other device placement. In preferred embodiments, the tray assembly 110 is angled with respect to the ground so as to be tilted towards a standing user. A tray blocker 160 prevents items placed on tray face 164 of tray platform 130 from sliding off. Tray platform 130 in this embodiment comprises opposed tray lips 174 further comprising a plurality of tray inner restraints 166. Tray supports 132, 134 are provided as part of the assembly to mount a tray platform 130 to an opposed set of outer struts 122, 126. Aligned tray inner restraints 166 fix the tray supports 132, 134 to tray platform 130 at tray lips 174. A first and second tray support 132, 134 each comprise a front support lip 170 and rear support lip 172 comprising a plurality of spaced tray outer restraints 168. The tray outer restraints 168 align with front and back strut restraints 152, 154 on first and second outer strut 122, 126 to secure tray supports 132, 134 to the first and second column 102, 104. Again the restraints may be in the form of aligned holes for occupation by fasteners, or weld sites, or other securing devices. The tray assembly 110 may be adjusted to a variety of vertical heights on the first and second column 102, 104 to accommodate the user. The tray assembly 110 is secured to a pair of opposing struts thereby increasing overall stability of the clamp rack assembly 100.

Figure 18:
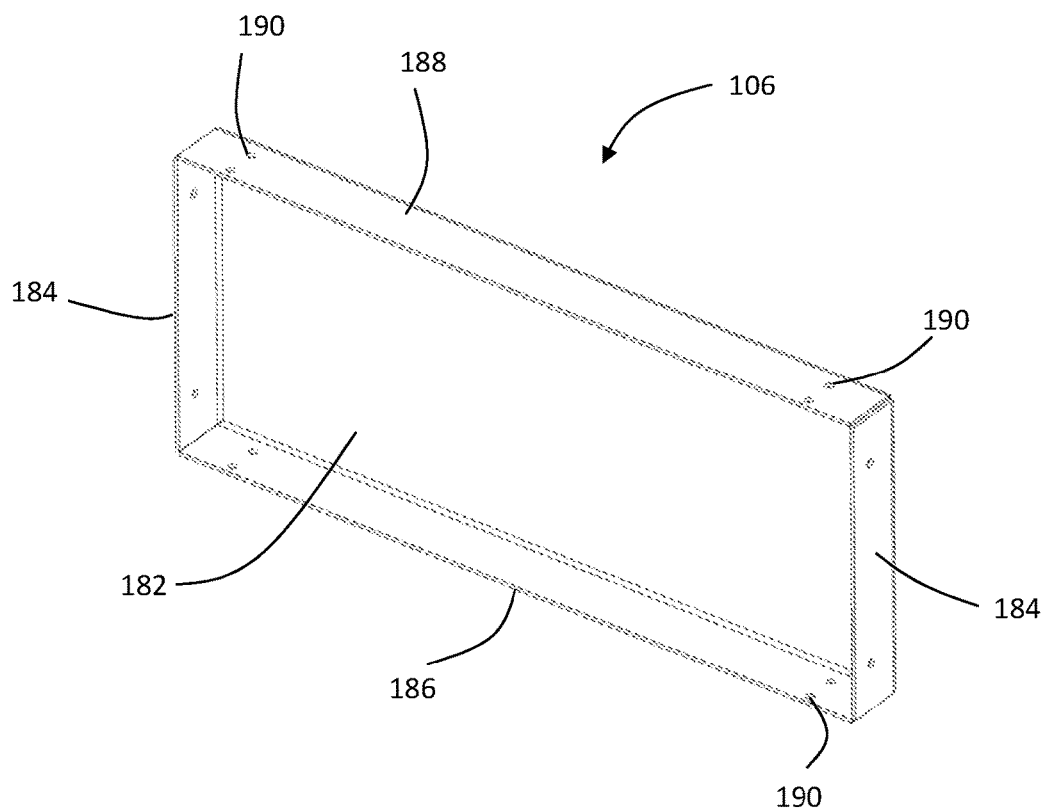
FIG. 18 depicts a perspective view of a superior frame portion of a clamp rack system according to one or more embodiments shown and described herein.

FIG. 18 illustrates a preferred embodiment of a superior frame 106 portion of a clamp rack assembly 100. It comprises a superior wall 182 with opposed lateral walls 184, a rear wall 186, and a front wall 188 extending from it. A plurality of wall restraints 190 illustrated here in the form of holes align with complementary holes on the first and second column 104, 102. The superior frame 106 provides stability to the clamp rack assembly 100 from a superior end.

An alternative embodiment of a clamp rack system is illustrated in FIGS. 25 and 27-30. This embodiment is configured with a releasable clamp retainer system for holding and retaining various styles of clamp tools. In an alternative form, clamp 212 (FIG. 26, 26A) comprises a clamp body 218 with a clamp tongue 216 extending from one side of the clamp body. Extending from one side of clamp tongue 216 is clamp retainer 214. Again, a clamp tongue 216 and retainer 214 may be referred to as a clamp holder.

Figure 25:
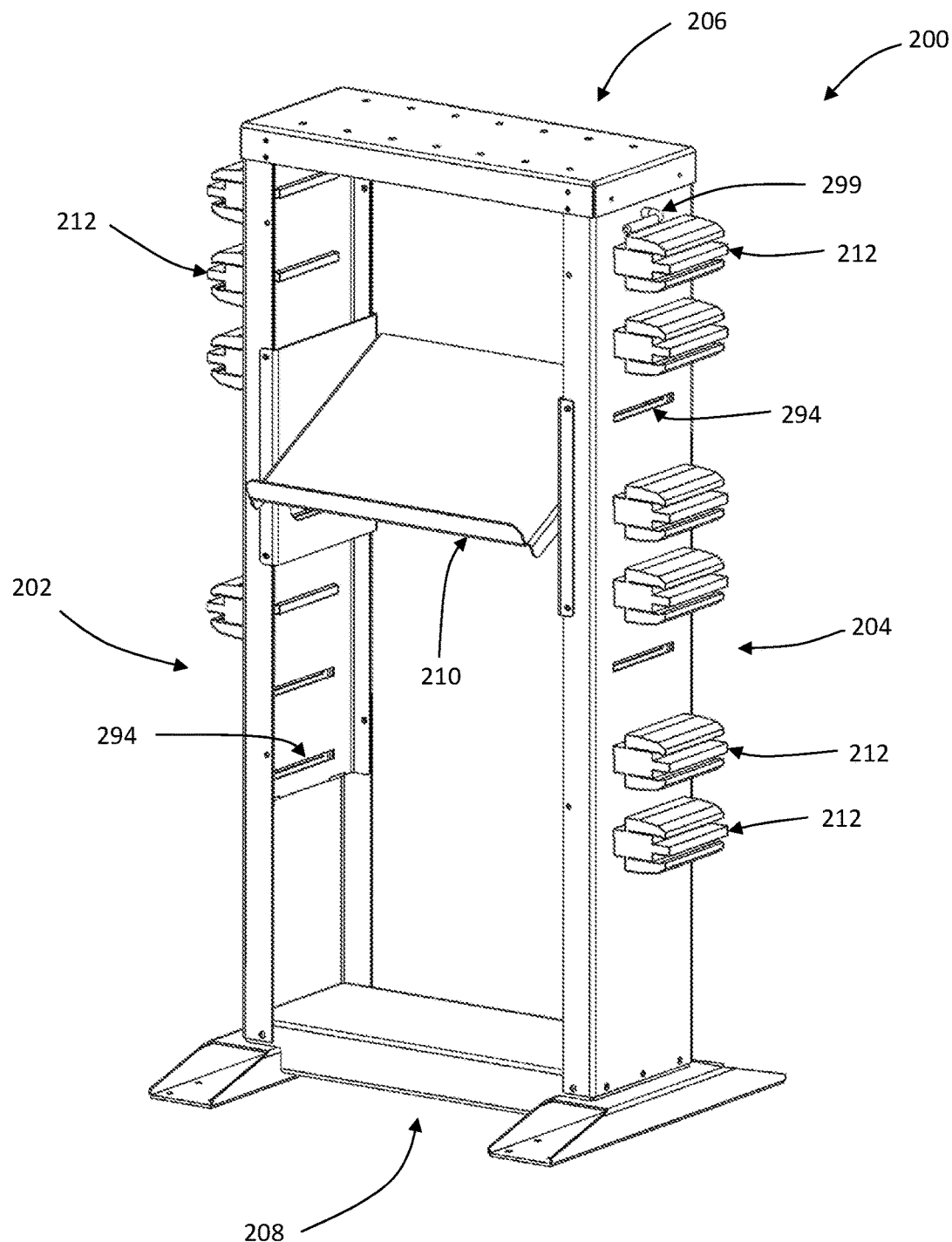
FIG. 25 depicts a top perspective view of a clamp rack system having a positioner activator according to one or more embodiments shown and described herein.
Figure 26:
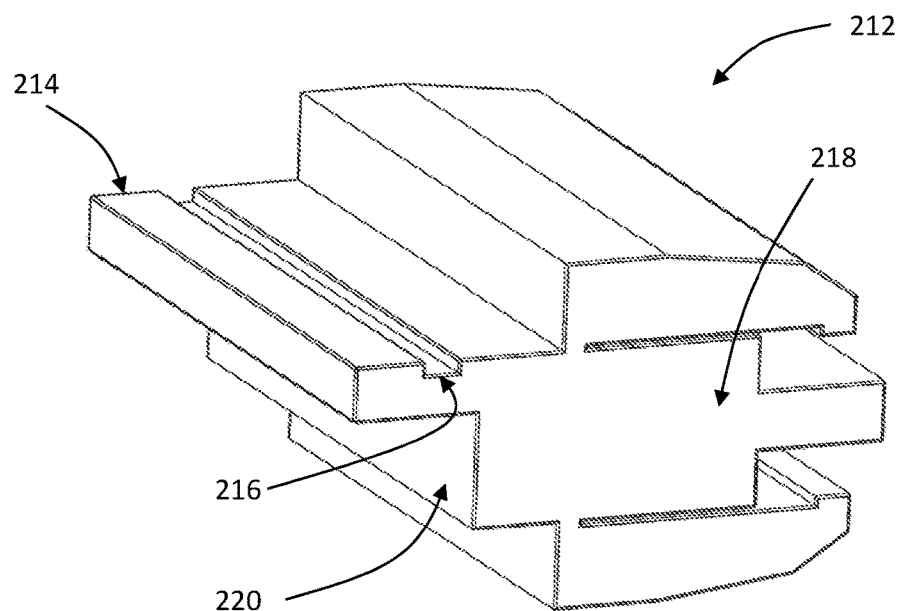
FIG. 26 depicts a perspective view of a clamp according to one or more embodiments shown and described herein.
Figure 27:
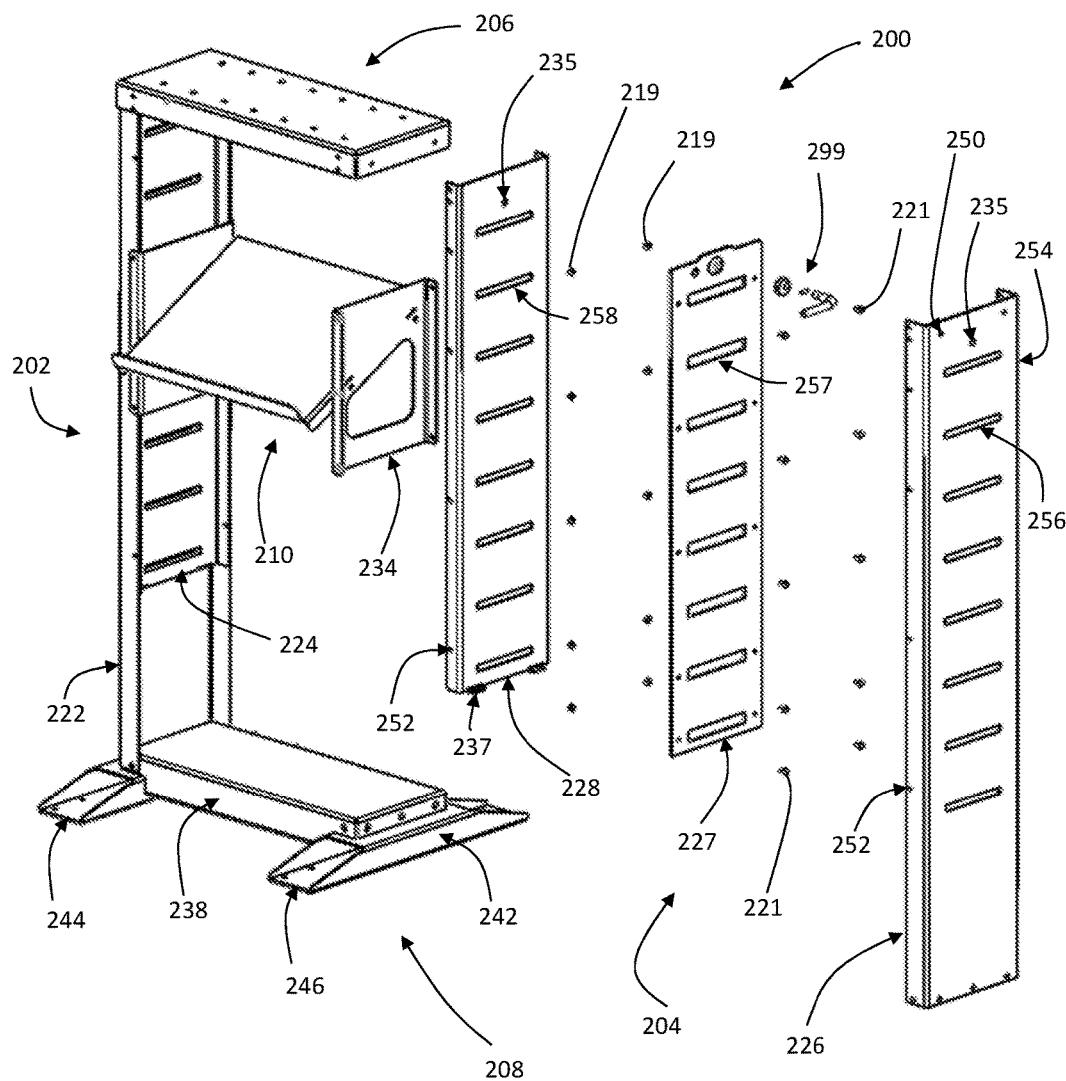
FIG. 27 depicts an exploded perspective view of a clamp rack system with a positioner activator according to one or more embodiments shown and described herein.

As illustrated in FIGS. 25 and 27, a mobile clamp rack system 200 comprises a first column 202 and an opposed second column 204. Each column comprises one or more slot corridors 294 for receiving one or more clamp tools. Each column 202, 204 in this embodiment comprises a corresponding outer strut 222, 226 and an inner strut 224, 228. For example, first column 202 (FIG. 27) comprises a first inner strut 224 housed within a first outer strut 222 and second column 204 comprises a first inner strut 228 housed within a first outer strut 226. The inner and outer struts of the embodiment illustrated in FIG. 27 include features presented previously. In addition, inner strut 224 and 228 further comprise one or more laterally protruding stops extending from a lower surface to serve as a resting surface for a mid strut.

Slidingly disposed between first inner strut 224 and first outer strut 222 is first mid strut 223. On the opposing side disposed between second inner strut 228 and second outer strut 226 is second mid strut 227 as illustrated in FIG. 27. In this embodiment, second mid strut 227 is in the form of a slotted panel as further illustrated in FIG. 29. Strut 227 comprises a positioner 203 in the form of an elongate hole. Through a strut face are one or more slide receivers 229 for housing glides. In this embodiment the slide receivers 229 are in the form of holes to house an inner glide 219 and an outer glide 221. Here inner glide 219 is in the form of a polymer nut cooperating with an outer glide 221 in the form of a polymer screw. Together glides 219 and 221 space the mid struts between the corresponding outer and inner strut providing for mid struts to slide therebetween without scratching.

Similar to previous embodiments, the inner and outer struts comprise a series of aligned upper strut restraints 250, a series of aligned back strut restraints 254 and a series of front strut restraints 252 (FIG. 27). These aligned restraints are preferably in the form of holes for the passage of fasteners to secure the inner struts and outer struts together but may assume other forms such as welds. Upon alignment of these aforementioned restraints, a series of vertically aligned opposed spaced slots are created. First and second inner struts 224, 228 and first and second outer struts 222, 226 may further include aligned bearing receivers 235 to hold a portion of positioner activator 299.

First and second mid struts 223 and 227 comprise one or more corresponding mid clamp slots 257. In an un-locked configuration, positioner activator 299 adjusts the position of a corresponding mid strut 223, 227 wherein the mid clamp slots 257 are aligned with the corresponding aligned inner and outer clamp slot providing insertion or removal of a clamp holder in slot corridor 294. To initiate a locked configuration, positioner activator 299 is adjusted to cause the re-position of a corresponding mid strut 223, 227 wherein the mid clamp slots 257 are mis-aligned with the corresponding aligned inner and outer clamp slot within the slot corridor 294. As a consequence, the mid strut causes interference in the aligned inner and outer clamp slot.

Figure 26A:
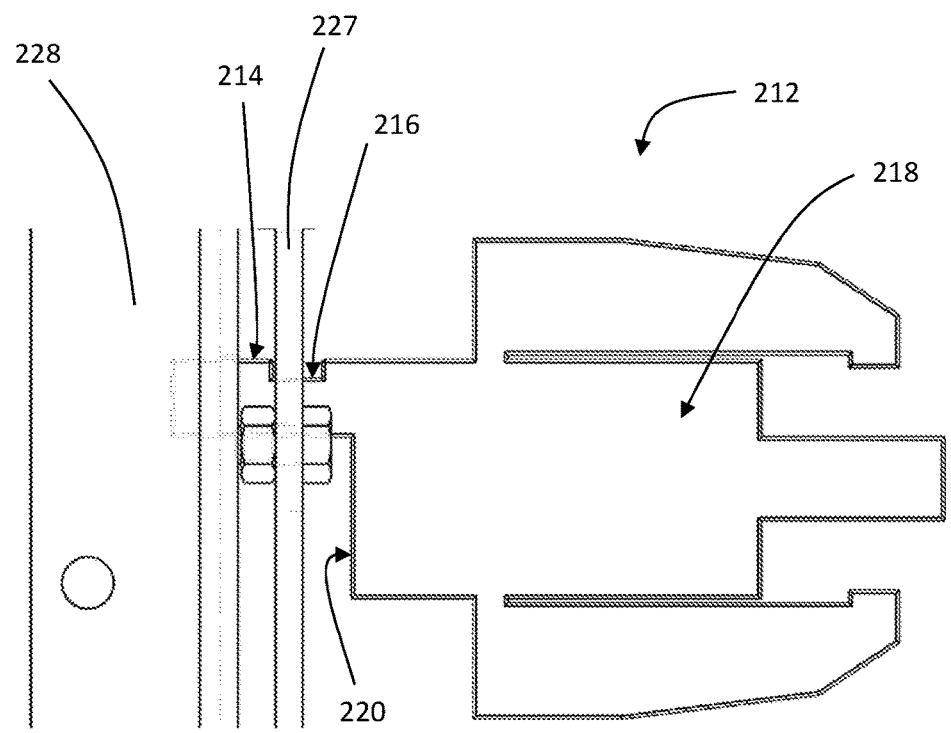
FIG. 26A depicts a side view of a clamp illustrating a mid strut interlocking with a clamp tongue of the clamp according to one or more embodiments shown and described herein.

In the embodiment illustrated in FIG. 25, clamp tools 212 are locked in slot corridor 294 by the interference of mid strut 227 as illustrated in FIG. 26A where the second outer strut is illustrated as removed. Here, second mid strut 227 moves downward in the locked configuration to engage clamp tongue 216 thereby preventing the clamp tool from falling out or otherwise being removed from slot corridor 294.

Similar to the FIG. 14 embodiment but illustrated here in FIG. 27, the first and second columns 202, 204 extend between a superior frame 206 and inferior main frame 208. The inferior main frame 208 comprises a first base leg 240 and a second base leg 242 (FIG. 27 and FIG. 28—with outer strut removed) to provide stability to the clamp rack assembly 200. The base legs 240, 242 include a corresponding first caster plate 244 and second caster plate 246 on which casters 31 are mounted to provide rolling mobility of the rack system 200 by push of the user on one of the columns 202, 204. As shown, the caster plates 244, 246 may include threaded or non-threaded holes for alignment and fastening of casters 31. The casters 31 may be lockable or a braking mechanism may be included in the rack to limit unintentional moment of the rack system. Base legs 240, 242 are secured to inferior strut 238 which spans between first and second columns 202, 204. Inferior strut 238 comprises a top wall 289 and front wall 288 and rear wall 286 and opposing lateral walls 284. Forward leg recess 278 (note similar numbers+100 in FIG. 24) and rear leg recess 280 conform to inferior strut 238 to partially wrap around corresponding legs 240, 242. Support flange 296 provides stiffness to inferior strut 238. A series of restraints in the form of holes through front wall 288, rear wall 286, and opposing lateral wall 284 align with corresponding lower strut restraints 248 on the first and second outer struts 222, 226. Welds may be utilized such as between the base legs 240, 242 and at the forward and rear leg recess 278, 280 intersection.

Figure 28:
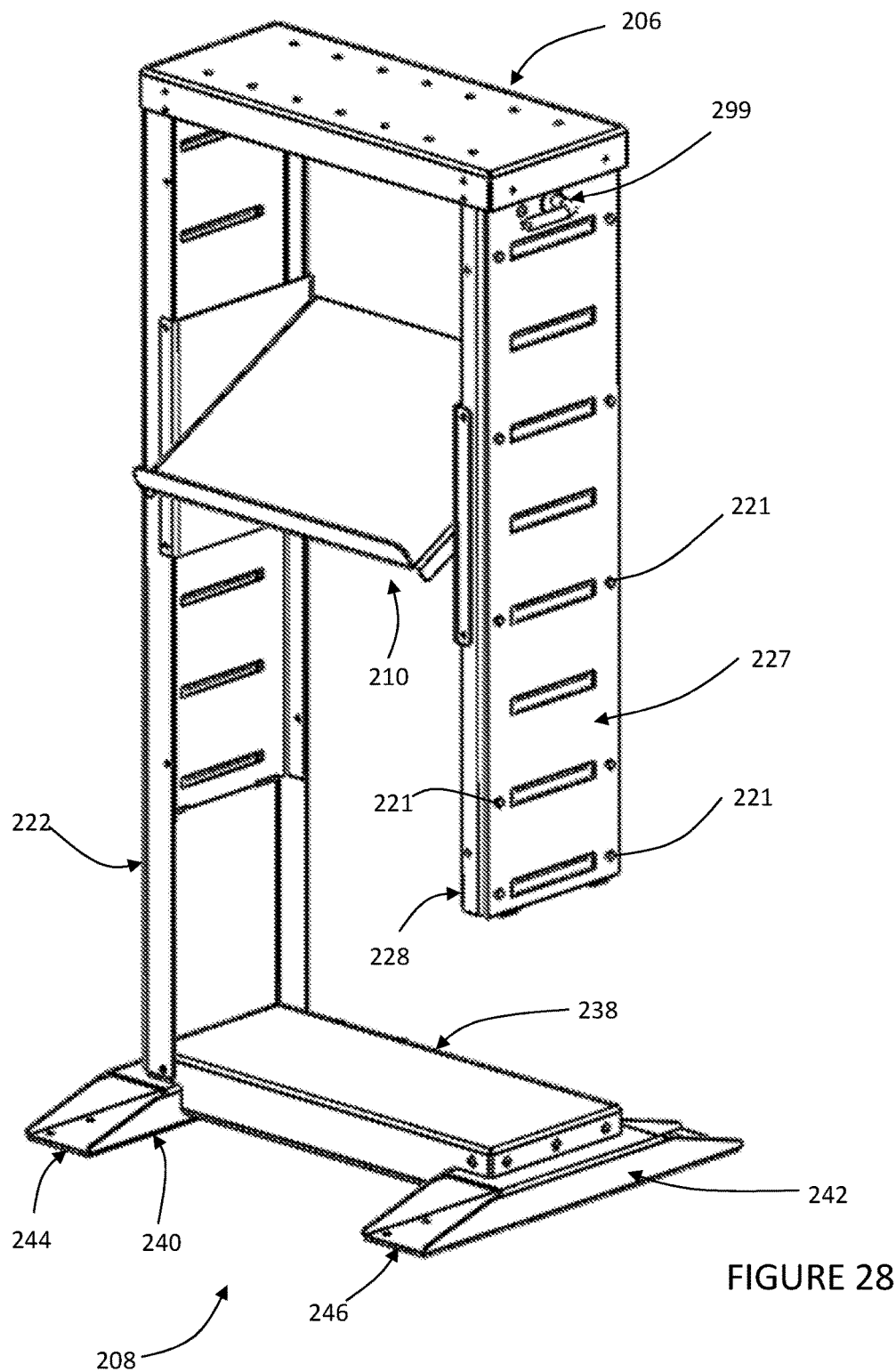
FIG. 28 depicts a perspective view of a clamp rack system with a positioner activator and second outer strut removed according to one or more embodiments shown and described herein.

A tray assembly 210 as illustrated in FIGS. 27 and 28 is secured between opposed first and second columns 202, 204 and operable as a work surface for paper work, a lap top computer, tablet or other device placement. In preferred embodiments, tray assembly 210 is angled with respect to the ground so as to be tilted towards a user. A tray blocker 260 prevents items placed on tray face 264 of tray platform 230 from sliding off. The tray platform 230 in this embodiment comprises opposed tray lips 274 further comprising a plurality of tray inner restraints 266. Tray supports 232, 234 are provided as part of the assembly to mount a tray platform 230 to an opposed set of outer struts 222, 226. Aligned tray inner restraints 266 fix the tray supports 232, 234 to tray platform 230 at tray lips 274. A first and second tray support 232, 234 each comprise a front support lip 270 and rear support lip 272 comprising a plurality of spaced tray outer restraints 268. The tray outer restraints 268 align with front and back strut restraints 252, 254 on first and second outer strut 222, 226 to secure tray supports 232, 234 to the first and second column 202, 204. Again the restraints may be in the form of aligned holes for occupation by fasteners, or weld sites, or other securing devices. The tray assembly 210 may be adjusted to a variety of vertical heights on the first and second column 202, 204 to accommodate the user. The tray assembly 210 is secured to a pair of opposing struts thereby increasing overall stability of the clamp rack assembly 200.

FIG. 27 illustrates a preferred embodiment of a superior frame 206 portion of a clamp rack assembly 200. Much like the embodiment of FIG. 18, superior frame 206 comprises a superior wall 282 with opposed lateral walls 284, a rear wall 286, and a front wall 288 extending from it. A plurality of wall restraints 290 illustrated here in the form of holes align with complementary holes on the first and second column 204, 202. The superior frame 206 provides stability to the clamp rack assembly 200 from a superior end.

Figures 29, 30:
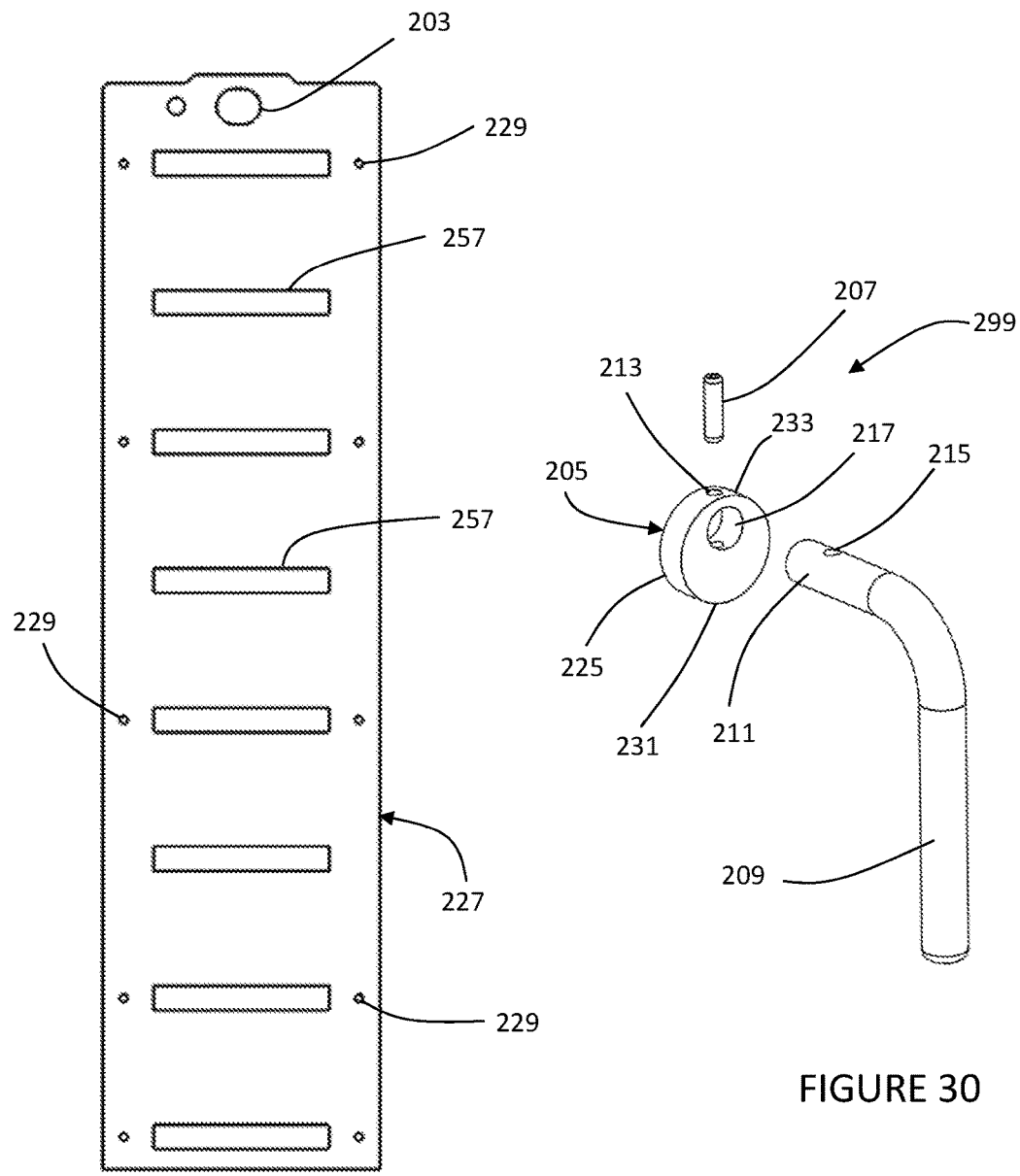
FIG. 29 depicts a front view of a mid strut according to one or more embodiments shown and described herein.
FIG. 30 depicts a perspective view of a positioner activator according to one or more embodiments shown and described herein.

FIG. 30 illustrates a preferred embodiment of a position activator 299. In this form, the position activator 299 comprises a handle portion 209 generally perpendicularly extending from a drive portion 211. A positioner driver 205 is secured to drive portion 211 through the use of a lock pin 207 extending through a first receiver 213 on positioner driver 205 and into a second receiver 215 extending through drive portion 211. Positioner driver 205 is cammed comprising an elevated unlock lobe 231 and a depressed lock lobe 233. Drive face 225 rides within positioner 203 while outer surface portions of drive portion 211 extend between bearing receivers 235 of an inner and outer strut for support. The downward weight of a mid strut causes surfaces in positioner 203, here in the form of an elongate hole, to ride against drive face 225. Rotation of handle portion 209 such that unlock lobe 231 causes a consequent elevation of a corresponding mid strut aligns middle clamp slots with the corresponding inner and outer clamp slots thereby providing for clamp tool 212 removal. Rotation of handle portion 209 such that that lock lobe 233 imparts a consequent lowering of a corresponding mid strut causes middle clamp slots to be misaligned with corresponding inner and outer clamp slots thus interfering with the clamp tools and preventing their removal from slot corridor 294.

In a preferred embodiment, a method of using a clamp rack assembly may include the following steps. The user unlocks braking on a caster 31 or otherwise on the assembly 100 if present. Pushing against the first or second column 102, 104, or tray assembly 110, the user moves the clamp rack assembly 100 near a press. The user removes a clamp 112 from the press machine. Aligning clamp tongue 116 with slot corridor 194 extending into the selected first or second column 102, 104; the user inserts the clamp tongue 116 into the slot corridor 194 moving base wall 120 proximal to the outer wall of the selected column 102, 104. The user releases clamp body 118 allowing it to tilt down thereby engaging clamp retainer 114 on a distal wall of an inner strut 124 or 128 to secure the clamp. Other clamps are stored on the clamp rack assembly 100 as needed. The clamp rack assembly may be rolled away until needed again or a new set of clamps 112 may be selected from the clamp rack assembly 100. The user grasps both sides of the clamp and tilts up slightly to release the clamp retainer 114 from the distal wall of an inner strut then retracts the clamp 112 from the slot corridor 194 before loading it into the press. The step is repeated until all clamps needed on the press are loaded. The clamp rack assembly 100 is then rolled away and brakes relocked if so desired.

In an alternative embodiment, a method of using a clamp rack assembly may include the following steps. The user unlocks braking on a caster 31 or otherwise on the assembly 200 if present. Pushing against the first or second column 202, 204, or tray assembly 210, the user moves the clamp rack assembly 200 near a press and rotates handle portion 209 of position activator to the unlocked position. The user removes a clamp 212 from a press machine. Aligning clamp tongue 216 with slot corridor 294 extending into the selected first or second column 202, 204; the user inserts the clamp tongue 216 into the slot corridor 294 moving base wall 220 proximal to the outer wall of the selected column 202, 204. The user releases clamp body 218 allowing it to tilt down then proceeds to load and unload clamps 212 in and out slot corridors 294. The user then rotates handle portion 209 of position activator 299 to the locked position. The clamp rack assembly may be rolled away until needed again or a new set of clamps 212 may be selected from the clamp rack assembly 200. The user grasps both sides of a clamp and distracts slightly to remove the clamp from the slot corridor 294 before loading it into the press. The step is repeated until all clamps needed on the press are loaded. The clamp rack assembly 200 is then rolled away and brakes relocked if so desired.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An ergonomic cart for eased transport of a machine tool between a machine tool storage rack and a machine comprising:
   an elevator portion;
   a carrier frame portion secured above said elevator portion;
   a lower frame assembly;
   one or more wheels secured to said lower frame assembly for rolling transport of the ergonomic cart;
   said elevator portion adjustable in height to raise and lower said carrier frame portion from said lower frame assembly;

a tumbler portion for holding machine tooling;
said tumbler portion secured to said carrier frame;
said tumbler portion comprising at least one generally horizontal punch rail;
said at least one generally horizontal punch rail comprising a punch channel extending along its length for capture of a portion of machine tooling;
and wherein said punch channel is rotatable within said tumbler portion between a superior facing position and an inferior facing position.

2. The ergonomic cart of claim 1 wherein said tumbler portion further comprises:
a first rotary ring;
and a second rotary ring.

3. The ergonomic cart of claim 2 wherein said first rotary ring is spaced generally horizontally from said second rotary ring.

4. The ergonomic cart of claim 2 wherein said first rotary ring and said second rotary ring are each supported by a rotary glide providing rotational support about a generally horizontal axis.

5. The ergonomic cart of claim 2 wherein said first rotary ring and said second rotary ring are rotatable about a generally horizontal axis.

6. The ergonomic cart of claim 2 wherein said punch rail extends between said first rotary ring and said second rotary ring.

7. The ergonomic cart of claim 2 wherein said first rotary ring and said second rotary ring are rotatable 180 degrees or more.

8. The ergonomic cart of claim 2 further comprising a brake caliper for controlling rotation of said punch channel.

9. The ergonomic cart of claim 1 wherein in a storage configuration said punch channel is alignable with a rack channel on a storage rack and wherein in a load configuration said punch channel is alignable with a tool channel on a sheet metal press.

10. The ergonomic cart of claim 1 wherein said elevator portion is in the form of a scissors jack.

11. The ergonomic cart of claim 1 wherein said elevator portion utilizes a pressure cylinder controlled by a hand pump.

12. The ergonomic cart of claim 1 further comprising bellows enveloping said elevator portion.

13. The ergonomic cart of claim 1 wherein said tumbler portion further comprises:
a first linkage support arm extending from said carrier frame;
a second linkage support arm extending from said carrier frame;
a first driven arm pivotably attached at a first pivot to said first linkage support arm;
a second driven arm pivotably attached at a second pivot to said second linkage support arm;
a first driven link pivotably attached at a third pivot to an end of said first driven arm;
a second driven link pivotably attached at a fourth pivot to an end of said second driven arm;
and wherein said at least one horizontal punch rail extends between said first driven link and said second driven link.

14. The ergonomic cart of claim 13 further comprising:
a first sprocket aligned with said first pivot;
a second sprocket aligned with said third pivot;
and wherein said first sprocket and said second sprocket are coupled by a chain.

15. The ergonomic cart of claim 14 wherein rotational movement of said first sprocket causes consequent movement of said punch channel between a position wherein said punch channel faces superiorly and a position wherein said punch channel faces inferiorly.

16. A method of using an ergonomic cart for eased transport of a machine tool between a machine tool storage rack and a machine comprising the steps of:
obtaining a movable cart having an elevator portion for adjusting the height of a tumbler portion and wherein said tumbler portion comprises a punch rail having a generally horizontal punch channel extending along the length of the punch rail;
setting said tumbler to a storage configuration wherein a first punch channel is configured to generally align with a rack channel on a storage rack;
sliding a machine tool from said rack channel on the storage rack into the first punch channel on said tumbler;
moving the ergonomic cart from the machine tool storage rack to a manufacturing machine;
setting said tumbler to a load configuration wherein said first punch channel is rotated generally 180 degrees;
aligning said first punch channel with a tool channel on a manufacturing machine;
and sliding the machine tool from said first punch channel into said tool channel.

17. The method of using an ergonomic cart of claim 16 wherein the step of moving the ergonomic cart from the machine tool storage rack to a manufacturing machine further comprises the step of moving the ergonomic cart adjacent a sheet metal press.

18. The method of using an ergonomic cart of claim 16 wherein the step of setting said tumbler to a storage configuration wherein a first punch channel is configured to generally align with a rack channel on a storage rack further comprises the step of adjusting the height of said elevator portion.

19. The method of using an ergonomic cart of claim 16 wherein the step of aligning said first punch channel with a tool channel on a manufacturing machine further comprises the step of adjusting the height of said elevator portion.

* * * * *